United States Patent
Chang et al.

(10) Patent No.: US 10,270,811 B2
(45) Date of Patent: Apr. 23, 2019

(54) SECURITY DOMAIN MANAGEMENT METHOD, APPARATUS, AND SYSTEM

(71) Applicant: Huawei Technologies Co., Ltd., Shenzhen, Guangdong (CN)

(72) Inventors: Xinmiao Chang, Beijing (CN); Guoqing Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 236 days.

(21) Appl. No.: 15/503,317

(22) PCT Filed: Aug. 13, 2014

(86) PCT No.: PCT/CN2014/084307
§ 371 (c)(1),
(2) Date: Feb. 10, 2017

(87) PCT Pub. No.: WO2016/023199
PCT Pub. Date: Feb. 18, 2016

(65) Prior Publication Data
US 2018/0054463 A1 Feb. 22, 2018

(51) Int. Cl.
*H04L 29/06* (2006.01)
*H04W 12/08* (2009.01)
(Continued)

(52) U.S. Cl.
CPC .............. *H04L 63/20* (2013.01); *H04L 29/06* (2013.01); *H04L 41/046* (2013.01);
(Continued)

(58) Field of Classification Search
CPC ... H04L 63/20; H04L 63/0428; H04L 41/046; H04L 41/0806; H04L 29/06; H04W 12/08; H04W 12/02; H04W 12/00
See application file for complete search history.

(56) References Cited

U.S. PATENT DOCUMENTS 7,680,935 B2 *  3/2010  Szyperski ................ G06F 9/54
                                              709/204
9,628,981 B2 *  4/2017  Park ....................... H04W 12/06
(Continued)

FOREIGN PATENT DOCUMENTS

CN          101370248 A       2/2009
CN          102118385 A       7/2011
(Continued)

*Primary Examiner* — Darren B Schwartz

(57) ABSTRACT

The present invention provides a security domain management method, apparatus, and system, which relate to the communications field, and can manage, according to a service status of a user-subscribed service, a security domain used for storing service configuration information. A specific solution is as follows: A communications terminal obtains a management request message sent by a server, where the management request message includes an issuer security domain profile identifier; and the communications terminal manages a security subdomain in a mobile network operator profile corresponding to the issuer security domain profile identifier, where the security subdomain is used to store configuration information of a first service. The present invention is used for security domain management.

17 Claims, 20 Drawing Sheets

(51) Int. Cl.
*H04W 12/02* (2009.01)
*H04L 12/24* (2006.01)
*H04W 12/00* (2009.01)

(52) U.S. Cl.
CPC ...... *H04L 41/0806* (2013.01); *H04L 63/0428* (2013.01); *H04W 12/00* (2013.01); *H04W 12/02* (2013.01); *H04W 12/08* (2013.01)

(56) References Cited

U.S. PATENT DOCUMENTS

| | | | |
|---|---|---|---|
| 2002/0095414 A1* | 7/2002 | Barnett | G06F 21/604 |
| 2002/0129024 A1* | 9/2002 | Lee | G06F 21/41 |
| 2003/0120948 A1* | 6/2003 | Schmidt | H04L 63/0815 |
| | | | 726/8 |
| 2004/0260941 A1 | 12/2004 | Fearnley et al. | |
| 2008/0201339 A1* | 8/2008 | McGrew | G06Q 50/18 |
| 2010/0062808 A1* | 3/2010 | Cha | G06Q 20/3229 |
| | | | 455/558 |
| 2010/0083355 A1 | 4/2010 | Brown et al. | |
| 2012/0204224 A1 | 8/2012 | Wang et al. | |
| 2012/0278869 A1 | 11/2012 | Guccione et al. | |
| 2013/0111546 A1* | 5/2013 | Gargiulo | H04L 9/32 |
| | | | 726/1 |
| 2013/0227646 A1 | 8/2013 | Haggerty et al. | |
| 2013/0273889 A1* | 10/2013 | Lobmaier | H04W 12/00 |
| | | | 455/411 |
| 2014/0143534 A1* | 5/2014 | Chastain | H04L 63/0428 |
| | | | 713/150 |
| 2014/0189880 A1* | 7/2014 | Funk | G06F 21/62 |
| | | | 726/27 |
| 2015/0089569 A1* | 3/2015 | Sondhi | H04L 63/08 |
| | | | 726/1 |
| 2015/0319152 A1* | 11/2015 | Chastain | H04W 12/04 |
| | | | 726/4 |
| 2016/0099923 A1* | 4/2016 | Golla | H04W 12/04 |
| | | | 713/171 |
| 2016/0119780 A1* | 4/2016 | Jung | H04W 8/205 |
| | | | 455/419 |

FOREIGN PATENT DOCUMENTS

| | | |
|---|---|---|
| CN | 102668501 A | 9/2012 |
| CN | 103605939 A | 2/2014 |
| FR | 2994622 A1 | 2/2014 |
| WO | WO2011047276 A2 | 4/2011 |

* cited by examiner

SECURITY DOMAIN MANAGEMENT METHOD, APPARATUS, AND SYSTEM

CROSS REFERENCE TO RELATED APPLICATIONS

The present application claims priority under 35 U.S.C. § 365 to International Patent Application No. PCT/CN2014/084307 filed Aug. 13, 2014 which is incorporated herein by reference in its entirety.

TECHNICAL FIELD

The present invention relates to the communications field, and in particular, to a security domain management method, apparatus, and system.

BACKGROUND

In a mobile communications system, a smart card is mostly used to store information such as a user identity, a user authentication parameter (for example, a key), a user authentication algorithm, a user's address book and SMS data, and an operator's customized parameter, so as to facilitate inclusiveness of the user identity and user data and differentiated customization between operators. The smart card includes a SIM (Subscriber Identity Module, subscriber identity module) card, an USIM (Universal Subscriber Identity Module, universal subscriber identity module) card, an RUIM (Removable User Identity Module, removable user identity module) card, and the like.

In practical application, a user customizes a service from a mobile network operator, such as a mobile payment service. The mobile payment service needs a security chip for storing and managing a payment application and data (such as a user ID, a key, an attribute parameter, and a related application) that are highly security-demanding. The security chip may be placed on a handset board, a near field communication chip, or a secure digital memory card. Typically, the security chip is integrated into a smart card such as a universal integrated circuit card (Universal Integrated Circuit Card, UICC) and matches an independent security domain in the universal integrated circuit card, and is dedicatedly used to store and manage highly security-demanding applications and data that are related to payment and the like. The universal integrated circuit card further includes an embedded universal integrated circuit card (embedded Universal Integrated Circuit Card, eUICC). In order to enable the smart card to meet special requirements imposed on a terminal size, a terminal price, a physical characteristic or an electrical characteristic, and the like in some application scenarios and use environments, GSMA (Global System for Mobile communication Association, Global System for Mobile Communications Association) led by operators puts forwards requirements for the embedded universal integrated circuit card. The requirements for the eUICC at least include: creating subscription data of a mobile network operator (Mobile Network Operator, MNO) on the embedded universal integrated circuit card, and adding configuration information and a security domain that are related to a service to the subscription data of the mobile network operator on the embedded universal integrated circuit card, to manage a security domain that is used to store configuration information of a first service.

In a document of the European Telecommunications Standards Institute about the embedded universal integrated circuit card, a method for creating subscription data of a mobile network operator (Mobile Network Operator, MNO) on the embedded universal integrated circuit card is disclosed, and a specific practice is to create a profile on the embedded universal integrated circuit card for the mobile network operator. However, the disclosed technology part does not mention how to add configuration information and a security domain that are related to a newly subscribed service to a mobile network operator profile of the embedded universal integrated circuit card when a user newly subscribes to the service, and does not describe how to delete configuration information and a security domain that are related to an ended service from the mobile network operator profile of the embedded universal integrated circuit card when the user-subscribed service ends.

Therefore, no security domain management method can be learned, and the security domain that is used to store the service configuration information cannot be managed according to a service status of the user-subscribed service.

SUMMARY

Embodiments of the present invention provide a security domain management method, apparatus, and system, which can manage, according to a service status of a user-subscribed service, a security domain that is used to store service configuration information.

To achieve the foregoing objective, the following technical solutions are used in the embodiments of the present invention:

According to a first aspect, a communications terminal is provided, where a mobile network operator profile may be preconfigured in the communications terminal, and the communications terminal includes:

an obtaining unit, configured to obtain a management request message, where the management request message includes an issuer security domain profile identifier; and a management unit, configured to manage a security subdomain in a mobile network operator profile corresponding to the issuer security domain profile identifier that is included in the configuration request message obtained by the obtaining unit, where the security subdomain is used to store configuration information of a first service.

With reference to the first aspect, in a first possible implementation manner, the management request message includes a configuration request message, and the managing a security subdomain includes creating the security subdomain;

the obtaining unit is specifically configured to obtain the configuration request message when the first service is being newly subscribed to, where the configuration request message includes the issuer security domain profile identifier and the configuration information of the first service, and the configuration information of the first service includes application and data that are of the first service;

the management unit is specifically configured to: create the security subdomain in the mobile network operator profile corresponding to the issuer security domain profile identifier that is included in the configuration request message obtained by the obtaining unit, and store the configuration information of the first service in the security subdomain;

the communications terminal further includes:

an allocation unit, configured to allocate an identifier to the security subdomain created by the management unit; and the management unit is further configured to manage the security subdomain according to the identifier that is of the security subdomain and allocated by the allocation unit.

With reference to the first possible implementation manner of the first aspect, in a second possible implementation manner, the communications terminal further includes: a first sending unit, configured to send a configuration response message, where the configuration response message includes the identifier that is of the security subdomain and allocated by the allocation unit, so that a server manages the security subdomain according to the configuration response message.

With reference to the first aspect, in a third possible implementation manner, the management request message includes a deletion request message, and the managing a security subdomain includes deleting the security subdomain;

the obtaining unit is specifically configured to obtain the deletion request message when the first service ends, where the deletion request message includes the issuer security domain profile identifier and an identifier of the security subdomain; and the management unit is specifically configured to delete, according to the issuer security domain profile identifier and the identifier of the security subdomain that are included in the deletion request message obtained by the obtaining unit, the security subdomain in the mobile network operator profile corresponding to the issuer security domain profile identifier.

With reference to the third possible implementation manner of the first aspect, in a fourth possible implementation manner, the communications terminal further includes: a detection unit, configured to detect, according to the issuer security domain profile identifier and the identifier of the security subdomain that are included in the deletion request message obtained by the obtaining unit, application and data in the security subdomain that need to be saved; and a second sending unit, configured to send a saving request message, where the saving request message includes the application and the data that need to be saved and that are detected by the detection unit, so that a server saves, according to the saving request message, the application and the data that need to be saved; and the management unit is specifically configured to: after the second sending unit sends the saving request message, delete, according to the issuer security domain profile identifier and the identifier of the security subdomain that are obtained by the obtaining unit, the security subdomain in the mobile network operator profile corresponding to the issuer security domain profile identifier, and the application and the data in the security subdomain.

With reference to the third or the fourth possible implementation manner of the first aspect, in a fifth possible implementation manner, the communications terminal further includes:

a third sending unit, configured to send a deletion response message after the management unit deletes the security subdomain, where the deletion response message includes security subdomain deletion success state information and the identifier of the security subdomain deleted by the management unit.

With reference to any one of the first aspect, or the first to the fifth possible implementation manners, in a sixth possible implementation manner, the obtaining unit is further configured to obtain an activation request message;

the obtaining unit is further configured to obtain a user instruction according to the activation request message obtained by the obtaining unit; and the communications terminal further includes:

a change unit, configured to change a status of the mobile network operator profile to an active state when the user instruction obtained by the obtaining unit is an activation instruction; and a fourth sending unit, configured to send the activation response message, where the activation response message includes the status that is of the mobile network operator profile and changed by the change unit.

According to a second aspect, a server is provided, where a mobile network operator profile may be preconfigured on the server, and the server includes:

a sending unit, configured to send a query request message to a subscription manager secure routing, where the query request message includes an identifier of the subscription manager secure routing and an identifier of an embedded integrated circuit card;

an obtaining unit, configured to obtain a query response message sent by the subscription manager secure routing, where the query response message includes an issuer security domain profile identifier of a mobile network operator profile and a status of the mobile network operator profile; and a check unit, configured to check the status that is of the mobile network operator profile and that is included in the query response message obtained by the obtaining unit; where the sending unit is further configured to send a management request message when the status that is of the mobile network operator profile, included in the query response message, and checked by the check unit is an active state, so that a communications terminal manages a security subdomain according to the management request message, where the configuration request message includes the issuer security domain profile identifier, and the security subdomain is used to store configuration information of a first service.

With reference to the second aspect, in a first possible implementation manner, the management request message includes a configuration request message, and the managing a security subdomain includes creating the security subdomain; and that the sending unit is further configured to send a management request message when the status that is of the mobile network operator profile, included in the query response message, and checked by the check unit is an active state, so that a communications terminal manages a security subdomain according to the management request message, where the configuration request message includes the issuer security domain profile identifier, and the security subdomain is used to store configuration information of a first service specifically includes:

sending the configuration request message when the first service is being newly subscribed to and the status that is of the mobile network operator profile, included in the query response message, and checked by the check unit is an active state, so that the communications terminal creates the security subdomain according to the management request message, where the configuration request message includes the issuer security domain profile identifier and the configuration information of the first service, and the configuration information of the first service includes application information and data that are of the first service.

With reference to the first possible implementation manner of the second aspect, in a second possible implementation manner, the obtaining unit is further configured to obtain a configuration response message, where the configuration response message includes an identifier of the security subdomain; and the server further includes:

a configuration unit, configured to record the identifier that is of the security subdomain and that is obtained by the obtaining unit in the mobile network operator profile corresponding to the issuer security domain profile identifier.

With reference to the second possible implementation manner of the second aspect, in a third possible implementation manner, the sending unit is further configured to send a first update request message to the subscription manager secure routing after the configuration unit records the identifier of the security subdomain in the mobile network operator profile corresponding to the issuer security domain profile identifier, where the first update request message includes configuration information of the mobile network operator profile, so that the subscription manager secure routing updates the configuration information of the mobile network operator profile according to the first update request message, where the configuration information of the mobile network operator profile includes type, version, and security subdomain information of the mobile network operator profile.

With reference to the second aspect, in a fourth possible implementation manner, the management request message includes a deletion request message, and the managing a security subdomain includes deleting the security subdomain;

the obtaining unit is further configured to obtain an identifier of the security subdomain when the first service ends; and that the sending unit is further configured to send a management request message when the status that is of the mobile network operator profile, included in the query response message, and checked by the check unit is an active state, so that a communications terminal manages a security subdomain according to the management request message, where the configuration request message includes the issuer security domain profile identifier, and the security subdomain is used to store configuration information of a first service specifically includes:

sending the deletion request message when the status that is of the mobile network operator profile, included in the query response message, and checked by the check unit is an active state, so that the communications terminal deletes the security subdomain according to the management request message, where the deletion request message includes the issuer security domain profile identifier and the identifier of the security subdomain.

With reference to the fourth possible implementation manner of the second aspect, in a fifth possible implementation manner, the obtaining unit is further configured to obtain a saving request message, where the saving request message includes application and data that need to be saved; and the server further includes:

a saving unit, configured to save, according to the saving request message obtained by the obtaining unit, the application and the data that need to be saved.

With reference to the fourth or the fifth possible implementation manner of the second aspect, in a sixth possible implementation manner, the obtaining unit is further configured to obtain a deletion response message, where the deletion response message includes security subdomain deletion success state information and the identifier of the deleted security subdomain; and the server further includes:

a configuration unit, configured to delete an identifier of a security subdomain in the mobile network operator profile according to the security subdomain deletion success state information and the identifier of the deleted security subdomain that are obtained by the obtaining unit.

With reference to the sixth possible implementation manner of the second aspect, in a seventh possible implementation manner, the sending unit is further configured to send a second update request message to the subscription manager secure routing after the configuration unit deletes the identifier of the security subdomain in the mobile network operator profile, where the second update request message includes configuration information of the mobile network operator profile in which the identifier of the security subdomain is deleted by the configuration unit, so that the subscription manager secure routing updates the configuration information of the mobile network operator profile according to the second update request message.

With reference to the second aspect, or the first to the seventh possible implementation manners, in an eighth possible implementation manner, the sending unit is further configured to send an activation request message when the status that is of the mobile network operator profile, included in the query response message, and checked by the check unit is an inactive state;

the obtaining unit is further configured to obtain an activation response message, where the activation response message includes a status of the mobile network operator profile;

the check unit is further configured to check the status that is of the mobile network operator profile and that is included in the activation response message obtained by the obtaining unit; and the sending unit is further configured to send the management request message when the status that is of the mobile network operator profile, included in the activation response message, and checked by the check unit is an active state.

According to a third aspect, a communications terminal is provided, where the communications terminal includes a network interface, a processor, and a bus, where the network interface and the processor are interconnected by using the bus;

the network interface is configured to obtain a management request message, where the management request message includes an issuer security domain profile identifier; and the processor is configured to manage a security subdomain in a mobile network operator profile corresponding to the issuer security domain profile identifier that is included in the configuration request message obtained by the network interface, where the security subdomain is used to store configuration information of a first service.

With reference to the third aspect, in a first possible implementation manner, the management request message includes a configuration request message, and the managing a security subdomain includes creating the security subdomain;

the network interface is specifically configured to obtain the configuration request message when the first service is being newly subscribed to, where the configuration request message includes the issuer security domain profile identifier and the configuration information of the first service, and the configuration information of the first service includes application and data that are of the first service;

the processor is specifically configured to: create the security subdomain in the mobile network operator profile corresponding to the issuer security domain profile identifier that is included in the configuration request message obtained by the network interface, and store the configuration information of the first service in the security subdomain;

the processor is further configured to allocate an identifier to the security subdomain created by the processor; and the processor is further configured to manage the security subdomain according to the identifier that is of the security subdomain and allocated by the processor.

With reference to the first possible implementation manner of the third aspect, in a second possible implementation manner, the network interface is further configured to send a configuration response message, where the configuration response message includes the identifier that is of the security subdomain and allocated by the processor, so that a server manages the security subdomain according to the configuration response message.

With reference to the third aspect, in a third possible implementation manner, the management request message includes a deletion request message, and the managing a security subdomain includes deleting the security subdomain;

the network interface is specifically configured to obtain the deletion request message when the first service ends, where the deletion request message includes the issuer security domain profile identifier and an identifier of the security subdomain; and the processor is specifically configured to delete, according to the issuer security domain profile identifier and the identifier of the security subdomain that are included in the deletion request message obtained by the network interface, the security subdomain in the mobile network operator profile corresponding to the issuer security domain profile identifier.

With reference to the third possible implementation manner of the third aspect, in a fourth possible implementation manner, the processor is further configured to detect, according to the issuer security domain profile identifier and the identifier of the security subdomain that are included in the deletion request message obtained by the network interface, application and data in the security subdomain that need to be saved;

the network interface is further configured to send a saving request message, where the saving request message includes the application and the data that need to be saved and that are detected by the processor, so that a server saves, according to the saving request message, the application and the data that need to be saved; and the processor is specifically configured to: after the network interface sends the saving request message, delete, according to the issuer security domain profile identifier and the identifier of the security subdomain that are obtained by the network interface, the security subdomain in the mobile network operator profile corresponding to the issuer security domain profile identifier, and the application and the data in the security subdomain.

With reference to the third or the fourth possible implementation manner of the third aspect, in a fifth possible implementation manner, the network interface is further configured to send a deletion response message after the processor deletes the security subdomain, where the deletion response message includes security subdomain deletion success state information and the identifier of the security subdomain deleted by the processor.

With reference to any one of the third aspect, or the first to the fifth possible implementation manners, in a sixth possible implementation manner, the network interface is further configured to obtain an activation request message;

the network interface is further configured to obtain a user instruction according to the activation request message obtained by the network interface;

the processor is further configured to change a status of the mobile network operator profile to an active state when the user instruction obtained by the network interface is an activation instruction; and the network interface is further configured to send the activation response message, where the activation response message includes the status that is of the mobile network operator profile and changed by the processor.

According to a fourth aspect, a server is provided, where the server includes a network interface, a processor, and a bus, where the network interface and the processor are interconnected by using the bus;

the network interface is configured to send a query request message to a subscription manager secure routing, where the query request message includes an identifier of the subscription manager secure routing and an identifier of an embedded integrated circuit card;

the network interface is further configured to obtain a query response message sent by the subscription manager secure routing, where the query response message includes an issuer security domain profile identifier of a mobile network operator profile and a status of the mobile network operator profile;

the processor is configured to check the status that is of the mobile network operator profile and that is included in the query response message obtained by the network interface; and the network interface is further configured to send a management request message when the status that is of the mobile network operator profile, included in the query response message, and checked by the processor is an active state, so that a communications terminal manages a security subdomain according to the management request message, where the configuration request message includes the issuer security domain profile identifier, and the security subdomain is used to store configuration information of a first service.

With reference to the fourth aspect, in a first possible implementation manner, the management request message includes a configuration request message, and the managing a security subdomain includes creating the security subdomain; and that the network interface is further configured to send a management request message when the status that is of the mobile network operator profile, included in the query response message, and checked by the processor is an active state, so that a communications terminal manages a security subdomain according to the management request message, where the configuration request message includes the issuer security domain profile identifier, and the security subdomain is used to store configuration information of a first service specifically includes:

sending the configuration request message when the first service is being newly subscribed to and the status that is of the mobile network operator profile, included in the query response message, and checked by the processor is an active state, so that the communications terminal creates the security subdomain according to the management request message, where the configuration request message includes the issuer security domain profile identifier and the configuration information of the first service, and the configuration information of the first service includes application information and data that are of the first service.

With reference to the first possible implementation manner of the fourth aspect, in a second possible implementation manner, the network interface is further configured to obtain a configuration response message, where the configuration response message includes an identifier of the security subdomain; and the processor is further configured to record the identifier that is of the security subdomain and that is obtained by the network interface in the mobile network operator profile corresponding to the issuer security domain profile identifier.

With reference to the second possible implementation manner of the fourth aspect, in a third possible implementation manner, the network interface is further configured to send a first update request message to the subscription manager secure routing after the processor records the identifier of the security subdomain in the mobile network operator profile corresponding to the issuer security domain profile identifier, where the first update request message includes configuration information of the mobile network operator profile, so that the subscription manager secure routing updates the configuration information of the mobile network operator profile according to the first update request message, where the configuration information of the mobile network operator profile includes type, version, and security subdomain information of the mobile network operator profile.

With reference to the fourth aspect, in a fourth possible implementation manner, the management request message includes a deletion request message, and the managing a security subdomain includes deleting the security subdomain;

the network interface is further configured to obtain an identifier of the security subdomain when the first service ends; and that the network interface is further configured to send a management request message when the status that is of the mobile network operator profile, included in the query response message, and checked by the processor is an active state, so that a communications terminal manages a security subdomain according to the management request message, where the configuration request message includes the issuer security domain profile identifier, and the security subdomain is used to store configuration information of a first service specifically includes:

sending the deletion request message when the status that is of the mobile network operator profile, included in the query response message, and checked by the processor is an active state, so that the communications terminal deletes the security subdomain according to the management request message, where the deletion request message includes the issuer security domain profile identifier and the identifier of the security subdomain.

With reference to the fourth possible implementation manner of the fourth aspect, in a fifth possible implementation manner, the network interface is further configured to obtain a saving request message, where the saving request message includes application and data that need to be saved; and the server further includes a memory, where the memory, the network interface, and the processor are interconnected by using the bus; and the memory is configured to save, according to the saving request message obtained by the network interface, the application and the data that need to be saved.

With reference to the fourth or the fifth possible implementation manner of the fourth aspect, in a sixth possible implementation manner, the network interface is further configured to obtain a deletion response message, where the deletion response message includes security subdomain deletion success state information and the identifier of the deleted security subdomain; and the processor is further configured to delete an identifier of a security subdomain in the mobile network operator profile according to the security subdomain deletion success state information and the identifier of the deleted security subdomain that are obtained by the network interface.

With reference to the sixth possible implementation manner of the fourth aspect, in a seventh possible implementation manner, the network interface is further configured to send a second update request message to the subscription manager secure routing after the processor deletes the identifier of the security subdomain in the mobile network operator profile, where the second update request message includes configuration information of the mobile network operator profile in which the identifier of the security subdomain is deleted by the processor, so that the subscription manager secure routing updates the configuration information of the mobile network operator profile according to the second update request message.

With reference to the fourth aspect, or the first to the seventh possible implementation manners, in an eighth possible implementation manner, the network interface is further configured to send an activation request message when the status that is of the mobile network operator profile, included in the query response message, and checked by the processor is an inactive state;

the network interface is further configured to obtain an activation response message, where the activation response message includes a status of the mobile network operator profile;

the processor is further configured to check the status that is of the mobile network operator profile and that is included in the activation response message obtained by the network interface; and the network interface is further configured to send the management request message when the status that is of the mobile network operator profile, included in the activation response message, and checked by the processor is an active state.

According to a fifth aspect, a security domain management method is provided, where a mobile network operator profile may be preconfigured, and the security domain management method includes:

obtaining a management request message, where the management request message includes an issuer security domain profile identifier, and managing a security subdomain in a mobile network operator profile corresponding to the issuer security domain profile identifier, where the security subdomain is used to store configuration information of the first service.

With reference to the fifth aspect, in a first possible implementation manner, the management request message includes a configuration request message, and the managing a security subdomain includes creating the security subdomain;

the obtaining a management request message when the first service is being newly subscribed to, where the management request message includes an issuer security domain profile identifier specifically includes:

obtaining the configuration request message, where the configuration request message includes the issuer security domain profile identifier of the mobile network operator profile and the configuration information of the first service, and the configuration information of the first service includes application and data that are of the first service;

the managing a security subdomain in a mobile network operator profile corresponding to the issuer security domain profile identifier, where the security subdomain is used to store configuration information of the first service specifically includes:

creating the security subdomain in the mobile network operator profile corresponding to the issuer security domain profile identifier, where the security subdomain is used to store the configuration information of the first service; and the security domain management method further includes:

allocating an identifier to the security subdomain; and managing the security subdomain according to the identifier of the security subdomain.

With reference to the first possible implementation manner of the fifth aspect, in a second possible implementation manner, after the allocating an identifier to the security subdomain, the security domain management method further includes:

sending a configuration response message, where the configuration response message includes the identifier of the security subdomain, so that a server manages the security subdomain according to the configuration response message.

With reference to the fifth aspect, in a third possible implementation manner, the management request message includes a deletion request message, and the managing a security subdomain includes deleting the security subdomain;

the obtaining a management request message when the first service ends, where the management request message includes an issuer security domain profile identifier specifically includes:

obtaining the deletion request message, where the deletion request message includes the issuer security domain profile identifier and an identifier of the security subdomain; and the managing a security subdomain in a mobile network operator profile corresponding to the issuer security domain profile identifier, where the security subdomain is used to store configuration information of the first service specifically includes:

deleting, according to the issuer security domain profile identifier and the identifier of the security subdomain that are included in the deletion request message, the security subdomain in the mobile network operator profile corresponding to the issuer security domain profile identifier.

With reference to the third possible implementation manner of the fifth aspect, in a fourth possible implementation manner, before the deleting, according to the issuer security domain profile identifier and the identifier of the security subdomain that are included in the deletion request message, the security subdomain in the mobile network operator profile corresponding to the issuer security domain profile identifier, the method further includes:

detecting, according to the issuer security domain profile identifier and the identifier of the security subdomain that are included in the deletion request message, application and data in the security subdomain that need to be saved; and sending a saving request message, where the saving request message includes the application and the data that need to be saved, so that a server saves, according to the saving request message, the application and the data that need to be saved; and the deleting, according to the issuer security domain profile identifier and the identifier of the security subdomain that are included in the deletion request message, the security subdomain in the mobile network operator profile corresponding to the issuer security domain profile identifier specifically includes:

after the saving request message is sent, deleting, according to the issuer security domain profile identifier and the identifier of the security subdomain that are included in the deletion request message, the security subdomain in the mobile network operator profile corresponding to the issuer security domain profile identifier, and the application and the data in the security subdomain.

With reference to the third or the fourth possible implementation manner of the fifth aspect, in a fifth possible implementation manner, the method further includes:

sending a deletion response message after the security subdomain is deleted, where the deletion response message includes security subdomain deletion success state information and the identifier of the security subdomain.

With reference to any one of the fifth aspect, or the first to the fifth possible implementation manners, in a sixth possible implementation manner, before the obtaining a management request message, the method further includes:

obtaining an activation request message;

obtaining a user instruction according to the activation request message;

changing a status of the mobile network operator profile to an active state when the user instruction is an activation instruction; and sending the activation response message, where the activation response message includes the status of the mobile network operator profile.

According to a sixth aspect, a security domain management method is provided, where a mobile network operator profile may be preconfigured, and the method includes:

sending a query request message to a subscription manager secure routing, where the query request message includes an identifier of the subscription manager secure routing and an identifier of an embedded integrated circuit card;

obtaining a query response message sent by the subscription manager secure routing, where the query response message includes an issuer security domain profile identifier of a mobile network operator profile and a status of the mobile network operator profile;

checking the status that is of the mobile network operator profile and included in the query response message; and sending a management request message when the status that is of the mobile network operator profile and included in the query response message is an active state, so that a communications terminal manages a security subdomain according to the management request message, where the configuration request message includes the issuer security domain profile identifier, and the security subdomain is used to store configuration information of a first service.

With reference to the sixth aspect, in a first possible implementation manner, the management request message includes a configuration request message, and the managing a security subdomain includes creating the security subdomain; and the sending a management request message when the status that is of the mobile network operator profile and included in the query response message is an active state, so that a communications terminal manages a security subdomain according to the management request message, where the configuration request message includes the issuer security domain profile identifier, and the security subdomain is used to store configuration information of a first service specifically includes:

sending the configuration request message when the first service is being newly subscribed to and the status that is of the mobile network operator profile and included in the query response message is an active state, so that the communications terminal manages the security subdomain according to the management request message, where the configuration request message includes the issuer security domain profile identifier and the configuration information of the first service, and the configuration information of the first service includes application information and data that are of the first service.

With reference to the first possible implementation manner of the sixth aspect, in a second possible implementation manner, the method includes:

obtaining a configuration response message, where the configuration response message includes an identifier of the security subdomain; and recording the identifier of the security subdomain in the mobile network operator profile corresponding to the issuer security domain profile identifier.

With reference to the second possible implementation manner of the sixth aspect, in a third possible implementation manner, after the recording the identifier of the security subdomain in the mobile network operator profile corresponding to the issuer security domain profile identifier, the method further includes:

sending a first update request message to the subscription manager secure routing, where the first update request message includes configuration information of the mobile network operator profile, so that the subscription manager secure routing updates the configuration information of the mobile network operator profile according to the first update request message, where the configuration information of the mobile network operator profile includes type, version, and security subdomain information of the mobile network operator profile.

With reference to the sixth aspect, in a fourth possible implementation manner, the management request message includes a deletion request message, and the managing a security subdomain includes deleting the security subdomain;

before the sending a management request message when the status that is of the mobile network operator profile and included in the query response message is an active state, so that a communications terminal manages a security subdomain according to the management request message, where the configuration request message includes the issuer security domain profile identifier, and the security subdomain is used to store configuration information of a first service, the method further includes:

obtaining an identifier of the security subdomain when the first service ends; and the sending a management request message when the status that is of the mobile network operator profile and included in the query response message is an active state, so that a communications terminal manages a security subdomain according to the management request message, where the configuration request message includes the issuer security domain profile identifier, and the security subdomain is used to store configuration information of a first service specifically includes:

sending the deletion request message when the status that is of the mobile network operator profile and included in the query response message is an active state, so that the communications terminal deletes the security subdomain according to the management request message, where the deletion request message includes the issuer security domain profile identifier and the identifier of the security subdomain.

With reference to the fourth possible implementation manner of the sixth aspect, in a fifth possible implementation manner, the method further includes:

obtaining a saving request message, where the saving request message includes application and data that need to be saved; and saving, according to the saving request message, the application and the data that need to be saved.

With reference to the fourth or the fifth possible implementation manner of the sixth aspect, in a sixth possible implementation manner, the method further includes:

obtaining a deletion response message, where the deletion response message includes security subdomain deletion success state information and the identifier of the deleted security subdomain; and deleting an identifier of a security subdomain in the mobile network operator profile according to the security subdomain deletion success state information and the identifier of the deleted security subdomain.

With reference to the sixth possible implementation manner of the sixth aspect, in a seventh possible implementation manner, after the deleting an identifier of a security subdomain in the mobile network operator profile according to the security subdomain deletion success state information and the identifier of the deleted security subdomain, the method further includes:

sending a second update request message to the subscription manager secure routing after the identifier of the security subdomain in the mobile network operator profile is deleted, where the second update request message includes configuration information of the mobile network operator profile in which the identifier of the security subdomain is deleted, so that the subscription manager secure routing updates the configuration information of the mobile network operator profile according to the second update request message.

With reference to the sixth aspect, or the first to the seventh possible implementation manners, in an eighth possible implementation manner, before a management response message is obtained, the method further includes:

sending an activation request message if the status that is of the mobile network operator profile and included in the query response message is an inactive state;

obtaining an activation response message, where the activation response message includes a status of the mobile network operator profile;

checking the status that is of the mobile network operator profile and included in the activation response message; and sending the deletion request message when the status that is of the mobile network operator profile and included in the activation response message is an active state.

According to the security domain management method, apparatus, and system provided in the present invention, a communications terminal can obtain a management request message, where the management request message includes the issuer security domain profile identifier; and then the communications terminal manages a security subdomain in a mobile network operator profile corresponding to the issuer security domain profile identifier. The management request message includes a configuration request message, managing the security subdomain includes creating the security subdomain, the configuration request message further includes configuration information of a first service, and when the first service is being newly subscribed to, the configuration information of the first service may be stored in the security subdomain; or the management request message includes a deletion request message, managing the security subdomain includes deleting the security subdomain, the deletion request message includes an identifier of the security subdomain, and when the first service ends, the security subdomain may be deleted according to the identifier of the security subdomain. Therefore, according to the security domain management method, apparatus, and system provided in the present invention, a security domain that is used to store the configuration information of the first service can be managed according to a service status of a user-subscribed service.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
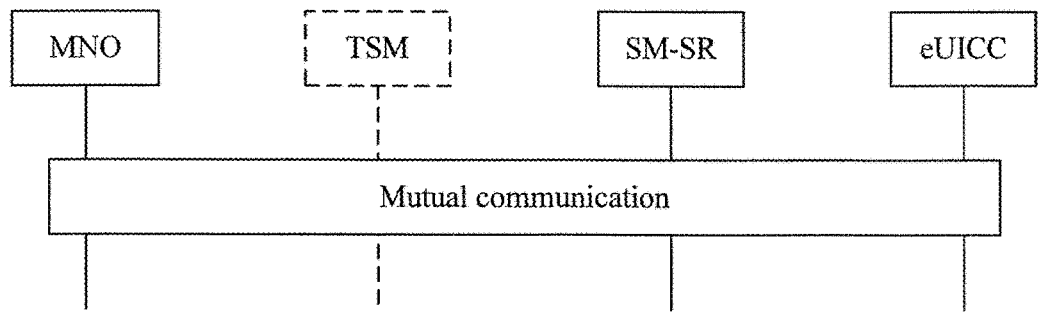
FIG. 1 is a schematic system diagram of a security domain management system according to an embodiment of the present invention.

Referring to FIG. 1, an embodiment of the present invention provides a security domain management system, where the security domain management system may include a server, a communications terminal, and a subscription manager secure routing (Subscription Manager Secure Routing, SM-SR) that can communicate with each other.

The server may be configured to bear a service of a mobile network operator (Mobile Network Operator, MNO), and may be specifically configured to send a message to instruct the communications terminal to manage a security domain in a mobile network operator profile that is preconfigured in the communications terminal itself, where the security domain may be used to store configuration information of a first service, and an MNO is used to represent the server in the reference diagram; and the first service may be a mobile payment service, or another payment-type service, or another service whose service configuration information needs to be stored by using a security domain.

The communications terminal may be an embedded universal integrated circuit card (embedded Universal Integrated Circuit Card, eUICC) itself, or may be an apparatus that bears the embedded universal integrated circuit card, and the communications terminal may be configured to manage the security domain in the mobile network operator profile of the communications terminal itself according to the message sent by the server. In the accompanying drawing, an eUICC is used as an example to represent the communications terminal.

The mobile payment service needs a security chip for storing and managing a payment application and data (such as a user ID, a key, an attribute parameter, and a related application) that are highly security-demanding. The security chip may be placed on a handset board, a near field communication chip, or a secure digital memory card, or may be integrated into a universal integrated circuit card and match an independent security domain in the universal integrated circuit card, and is dedicatedly used to store and manage highly security-demanding applications and data that are related to payment and the like. The universal integrated circuit card may include the embedded universal integrated circuit card. Therefore, a communications terminal that can bear the security chip may also be included in the communications terminal in the security domain management system provided in this embodiment of the present invention.

Specifically, the embedded universal integrated circuit card may be preconfigured in the communications terminal, and the communications terminal may be configured to implement data communication between the embedded universal integrated circuit card and another device, and the data communication may include at least one of obtaining data information or sending data information; and may further be configured to calculate data required by the embedded universal integrated circuit card. The embedded universal integrated circuit card may implement functions such as information processing and information communication by using the communications terminal that bears the embedded universal integrated circuit card, implement management of the security domain only according to various data obtained by the communications terminal that bears the embedded universal integrated circuit card, and may further store the mobile network operator profile.

The subscription manager secure routing may be configured to store information related to the mobile network operator profile, for example, an issuer security domain profile identifier of the mobile network operator profile; and may store information related to the security domain in the mobile network operator profile, for example, an identifier of the security domain.

Optionally, the security domain management system may further include a trusted service manager. The trusted service manager may be configured to implement trusted service management (Trusted Service Management, TSM), and may also communicate with another apparatus in the security domain management system. The trusted service manager may be configured to: when the server does not directly communicate with the communications terminal, transmit, between the server and the communications terminal, communication data for communication between the server and the communications terminal, and TSM is used to represent the trusted service manager in the reference diagram.

When the security domain management system cannot include the trusted service manager, the server itself may manage content that needs to be managed by the trusted service manager, and directly communicate with the communications terminal.

The security domain management system may be applied to the communications field, and may be used to create, in the mobile network operator profile (Mobile network operator profile, MNO Profile) of the communications terminal when a user newly subscribes to the first service, a security domain that may be used to store configuration information of the first service.

Optionally, the security domain management system may be applied to a scenario in which the first service ends (for example, the first service expires or a user is unsubscribed from the first service). In this case, the security domain that may be used to store the configuration information of the first service may be deleted from the mobile network operator profile in the apparatus on an embedded universal integrated circuit card side.

According to the security domain management system provided in this embodiment of the present invention, a communications terminal can obtain a sent management request message, where the management request message may include the issuer security domain profile identifier, and then the communications terminal manages a security subdomain in a mobile network operator profile corresponding to the issuer security domain profile identifier. When the first service is being newly subscribed to, the management request message may include a configuration request message, managing the security subdomain may include creating the security subdomain, the configuration request message may further include configuration information of the first service, and the communications terminal may store the configuration information of the first service in the security subdomain; or when the first service ends, the management request message may include a deletion request message, managing the security subdomain may include deleting the security subdomain, the deletion request message may include an identifier of the security subdomain, and the communications terminal may delete the security subdomain according to the identifier of the security subdomain. Therefore, according to the security domain management system provided in the present invention, a security domain that may be used to store the configuration information of the first service can be managed according to a service status of a user-subscribed service.

Figure 2:
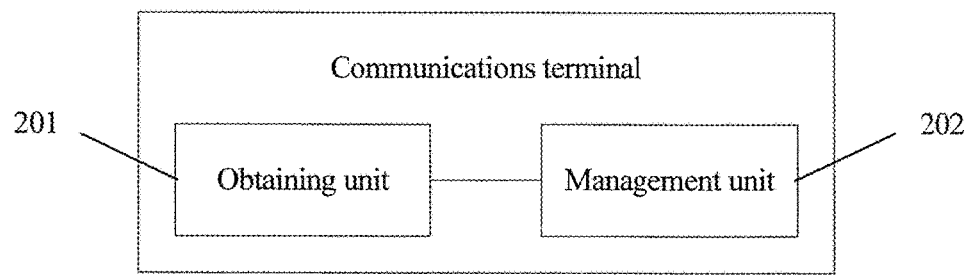
FIG. 2 is a schematic structural diagram of a communications terminal according to an embodiment of the present invention.

Referring to FIG. 2, an embodiment of the present invention provides a communications terminal, which may be applied to the communications field, and may be applied to the security domain management system shown in FIG. 1. A mobile network operator profile may be preconfigured in the communications terminal, and the communications terminal may include:

an obtaining unit 201, which may be configured to obtain a management request message sent by the server, where the management request message may include an issuer security domain profile (Issuer Security Domain Profile, ISD-P) identifier (Application ID, AID); and a management unit 202, which may be configured to manage a security subdomain in a mobile network operator profile corresponding to the issuer security domain profile identifier that is included in the configuration request message obtained by the obtaining unit 201, where the security subdomain may be used to store configuration information of a first service.

Optionally, the management request message may include a configuration request message, and the managing a security subdomain may include creating the security subdomain.

The obtaining unit 201 may be specifically configured to obtain the configuration request message when the first service is being newly subscribed to, for example, obtain a configuration request message sent by the server, where the configuration request message may include the issuer security domain profile identifier and the configuration information of the first service, and the configuration information of the first service may include application and data that are of the first service.

The management unit 202 may be specifically configured to: create the security subdomain in the mobile network operator profile corresponding to the issuer security domain profile identifier that is included in the configuration request message obtained by the obtaining unit 201, and store the configuration information of the first service in the security subdomain.

Figure 3:
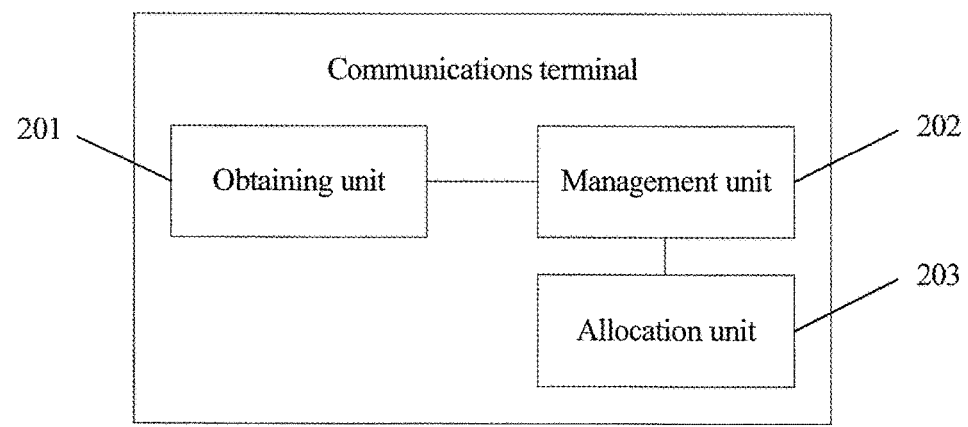
FIG. 3 is a schematic structural diagram of another communications terminal according to an embodiment of the present invention.

In this case, referring to FIG. 3, the communications terminal may further include:

an allocation unit 203, which may be configured to allocate an identifier to the security subdomain created by the management unit 202.

The management unit may be further configured to manage the security subdomain according to the identifier that is of the security subdomain and allocated by the allocation unit.

Figure 4:
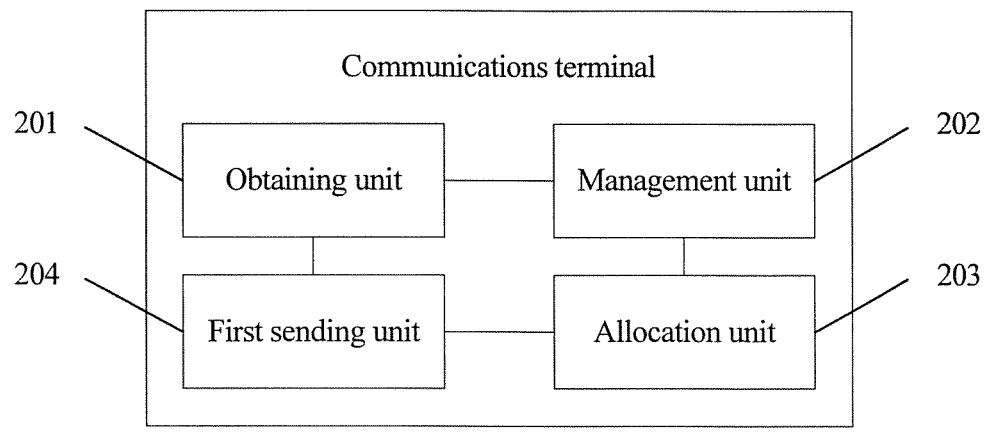
FIG. 4 is a schematic structural diagram of still another communications terminal according to an embodiment of the present invention.

In this case, optionally, referring to FIG. 4, the communications terminal may further include:

a first sending unit 204, which may be configured to send a configuration response message, for example, send a configuration response message to the server, where the configuration response message may include the identifier that is of the security subdomain and allocated by the allocation unit 203, so that the server manages the security subdomain according to the configuration response message.

Optionally, the management request message may include a deletion request message, and the managing a security subdomain may include deleting the security subdomain.

The obtaining unit 201 may be specifically configured to obtain the deletion request message when the first service ends, for example, obtain a deletion request message sent by the server, where the deletion request message may include the issuer security domain profile identifier and an identifier of the security subdomain.

The management unit 202 may be specifically configured to delete, according to the issuer security domain profile identifier and the identifier of the security subdomain that are included in the deletion request message obtained by the obtaining unit 201, the security subdomain in the mobile network operator profile corresponding to the issuer security domain profile identifier.

Figure 5:
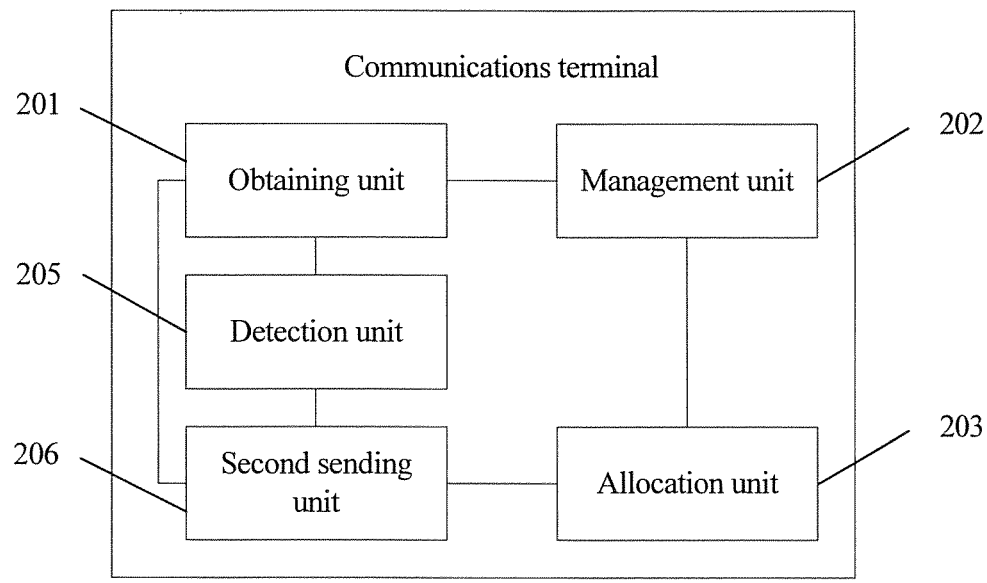
FIG. 5 is a schematic structural diagram of yet another communications terminal according to an embodiment of the present invention.

In this case, optionally, referring to FIG. 5, the communications terminal may further include:

a detection unit 205, which may be configured to detect, according to the issuer security domain profile identifier and the identifier of the security subdomain that are included in the deletion request message obtained by the obtaining unit 201, application and data in the security subdomain that need to be saved; and a second sending unit 206, which may be configured to send a saving request message, for example, send a saving request message to the server, where the saving request message may include the application and the data that need to be saved and that are detected by the detection unit 205, so that the server saves, according to the saving request message, the application and the data that need to be saved.

The management unit 202 may be specifically configured to: after the second sending unit 206 sends the saving request message, delete, according to the issuer security domain profile identifier and the identifier of the security subdomain that are obtained by the obtaining unit 201, the security subdomain in the mobile network operator profile corresponding to the issuer security domain profile identifier, and the application and the data in the security subdomain.

Figure 6:
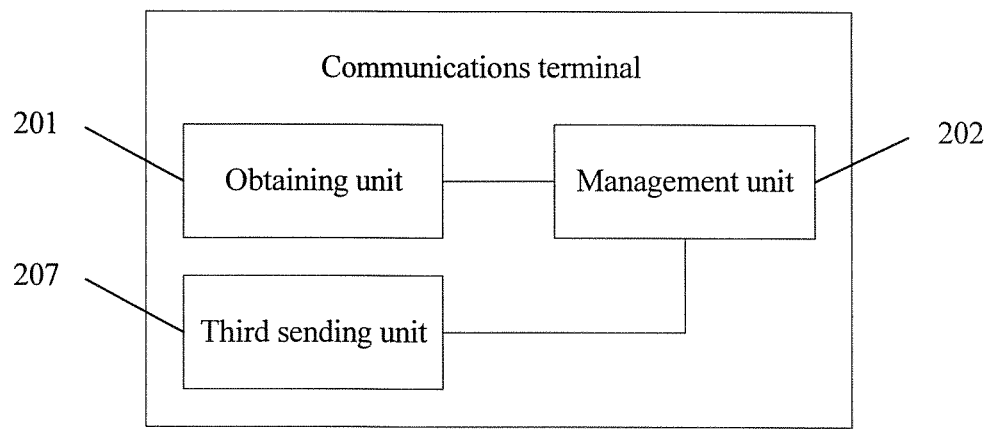
FIG. 6 is a schematic structural diagram of still yet another communications terminal according to an embodiment of the present invention.

Optionally, referring to FIG. 6, the communications terminal may further include:

a third sending unit 207, which may be configured to send a deletion response message after the management unit 202 deletes the security subdomain, for example, send a deletion response message to the server, where the deletion response message may include security subdomain deletion success state information and the identifier of the security subdomain deleted by the management unit 202.

Optionally, the obtaining unit 201 may be further configured to obtain an activation request message, for example, obtain an activation request message sent by the server.

The obtaining unit 201 may be further configured to obtain a user instruction according to the activation request message obtained by the obtaining unit 201.

Figure 7:
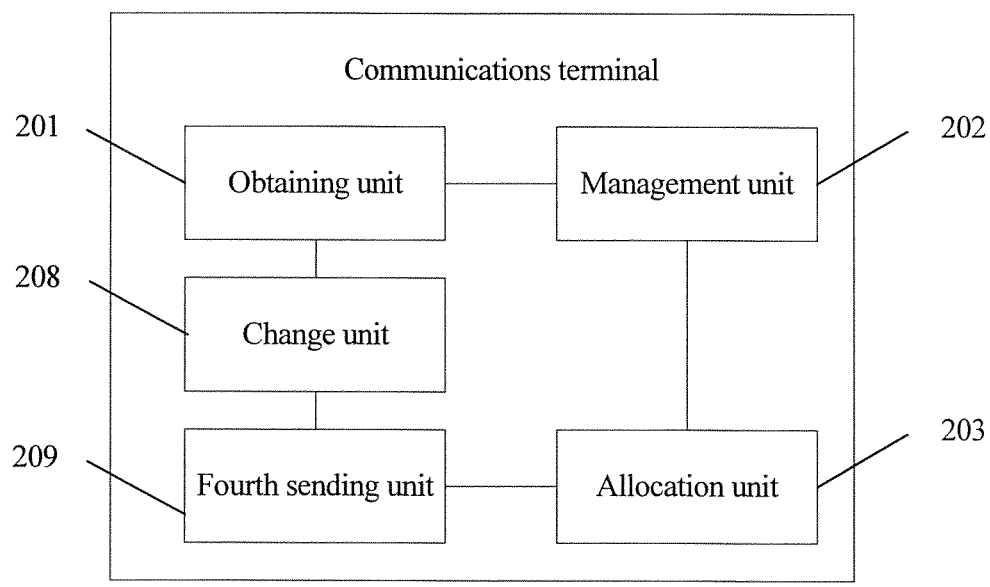
FIG. 7 is a schematic structural diagram of a further communications terminal according to an embodiment of the present invention.

In this case, referring to FIG. 7, the communications terminal may further include:

a change unit 208, which may be configured to change a status of the mobile network operator profile to an active state when the user instruction obtained by the obtaining unit 201 is an activation instruction; and a fourth sending unit 209, which may be configured to send an activation response message, for example, send the activation response message to the server, where the activation response message may include the status that is of the mobile network operator profile and changed by the change unit 208.

Optionally, when the security domain management system may include a trusted service manager, in this case, the obtaining unit 201 may be configured to: when the first service is being newly subscribed to, obtain a first connection request message sent by the trusted service manager, where the first connection request message carries an integrated circuit card identifier.

Figure 8:
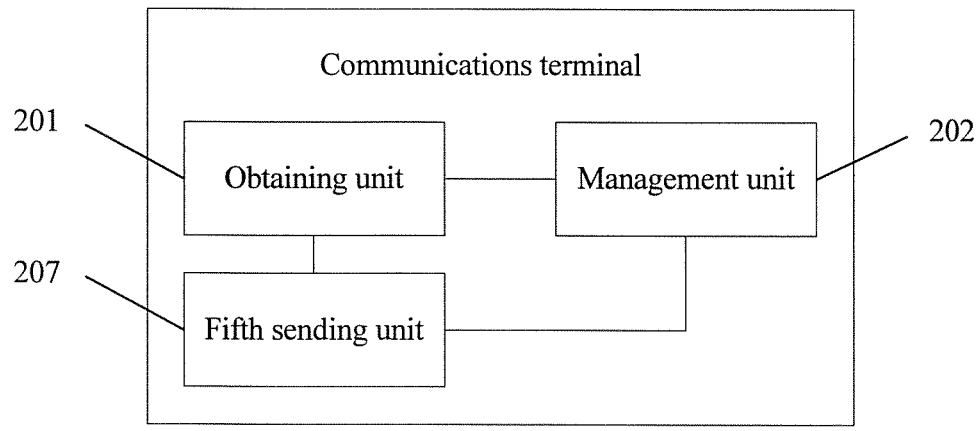
FIG. 8 is a schematic structural diagram of a still further communications terminal according to an embodiment of the present invention.

In this case, referring to FIG. 8, the communications terminal may further include:

a fifth sending unit 210, which may be configured to send a first connection response message when the integrated circuit card identifier that is carried in the first connection request message obtained by the obtaining unit 201 matches the communications terminal itself.

The obtaining unit 201 may be configured to obtain a first service request message sent by the trusted service manager, where the first service request message may include the issuer security domain profile identifier of the mobile network operator profile and the configuration information of the first service, and the configuration information of the first service may include application and data that are of the first service.

The management unit 202 may be configured to create the security subdomain in the issuer security domain profile represented by the issuer security domain profile identifier that is carried in the first service request message obtained by the obtaining unit 201, where the security subdomain may be used to store the configuration information of the first service.

The allocation unit 203 may be configured to allocate an identifier to the security subdomain created by the management unit 202, where the security subdomain may be used to store the configuration information of the first service.

The fifth sending unit 210 may be configured to send a first service response message to the trusted service manager, where the first service response message carries the identifier that is of the security subdomain and allocated by the allocation unit 203.

In this case, the management unit 202 may be configured to record the identifier that is of the security subdomain and that is obtained by the obtaining unit 201 in the mobile network operator profile.

Optionally, when the first service ends and the security domain management system may include a trusted service manager, in this case, the obtaining unit 201 may be configured to obtain a second connection request message sent by the trusted service manager, where the second connection request message carries an integrated circuit card identifier.

The fifth sending unit 210 may be configured to send a second connection response message when the integrated circuit card identifier that is carried in the second connection request message obtained by the obtaining unit 201 matches the communications terminal itself.

The obtaining unit 201 may be further configured to obtain a second service request message sent by the trusted service manager, where the second service request message carries the issuer security domain profile identifier and an identifier of the security subdomain.

In this case, the management unit 202 may be further configured to delete, according to the issuer security domain profile identifier and the identifier of the security subdomain that are carried in the second service request message obtained by the obtaining unit 201, the security subdomain in the issuer security domain profile.

According to the communications terminal provided in this embodiment of the present invention, the communications terminal can obtain a management request message sent by a server, where the management request message may include the issuer security domain profile identifier; and then the communications terminal manages a security subdomain in a mobile network operator profile corresponding to the issuer security domain profile identifier. When the first service is being newly subscribed to, the management request message may include a configuration request message, managing the security subdomain may include creating the security subdomain, the configuration request message may further include configuration information of the first service, and the communications terminal may store the configuration information of the first service in the security subdomain; or when the first service ends, the management request message may include a deletion request message, managing the security subdomain may include deleting the security subdomain, the deletion request message may include an identifier of the security subdomain, and the communications terminal may delete the security subdomain according to the identifier of the security subdomain. Therefore, a security domain that may be used to store the configuration information of the first service can be managed according to a service status of a user-subscribed service.

Figure 9:
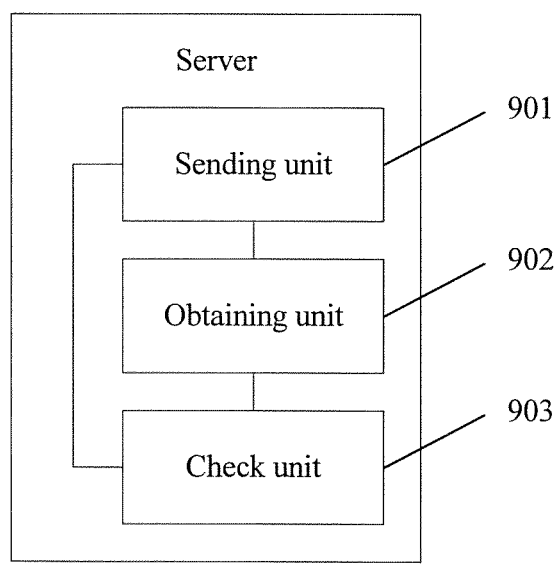
FIG. 9 is a schematic structural diagram of a server according to an embodiment of the present invention.

Referring to FIG. 9, an embodiment of the present invention provides a server, which may be applied to the communications field, and may be applied to the security domain management system shown in FIG. 1. A mobile network operator profile may be preconfigured on the server, and the server may include:

a sending unit 901, which may be configured to send a query request message to a subscription manager secure routing, where the query request message may include an identifier of the subscription manager secure routing (ID of the relevant SM-SR, SRID) and an identifier of an embedded integrated circuit card (eUICC-ID, EID);

an obtaining unit 902, which may be configured to obtain a query response message sent by the subscription manager secure routing, where the query response message may include an issuer security domain profile (Issuer Security Domain Profile, ISD-P) identifier (Application ID, AID) of the mobile network operator profile and a status of the mobile network operator profile; and a check unit 903, which may be configured to check the status that is of the mobile network operator profile and that is included in the query response message obtained by the obtaining unit 902.

The sending unit 901 may be further configured to send a management request message when the status that is of the mobile network operator profile, included in the query response message, and checked by the check unit 903 is an active state (Enabled), for example, send a management request message to the communications terminal, so that the communications terminal manages a security subdomain according to the management request message, where the configuration request message may include the issuer security domain profile identifier, and the security subdomain may be used to store configuration information of a first service.

Optionally, the management request message may include a configuration request message, and the managing a security subdomain may include creating the security subdomain.

That the sending unit 901 may be further configured to send a management request message when the status that is of the mobile network operator profile, included in the query response message, and checked by the check unit 903 is an active state (Enabled), for example, send a management request message to the communications terminal, so that the communications terminal manages a security subdomain according to the management request message, where the configuration request message may include the issuer security domain profile identifier, and the security subdomain may be used to store configuration information of a first service may specifically include:

the sending unit 901 may be configured to send the configuration request message when the first service is being newly subscribed to and the status that is of the mobile network operator profile, included in the query response message, and checked by the check unit 903 is an active state, for example, send a configuration request message to the communications terminal, so that the communications terminal creates the security subdomain according to the management request message, where the configuration request message may include the issuer security domain profile identifier and the configuration information of the first service, and the configuration information of the first service may include application information and data that are of the first service.

Further, optionally, the obtaining unit 902 may be further configured to obtain a configuration response message sent by the communications terminal, where the configuration response message may include an identifier of the security subdomain.

Figure 10:
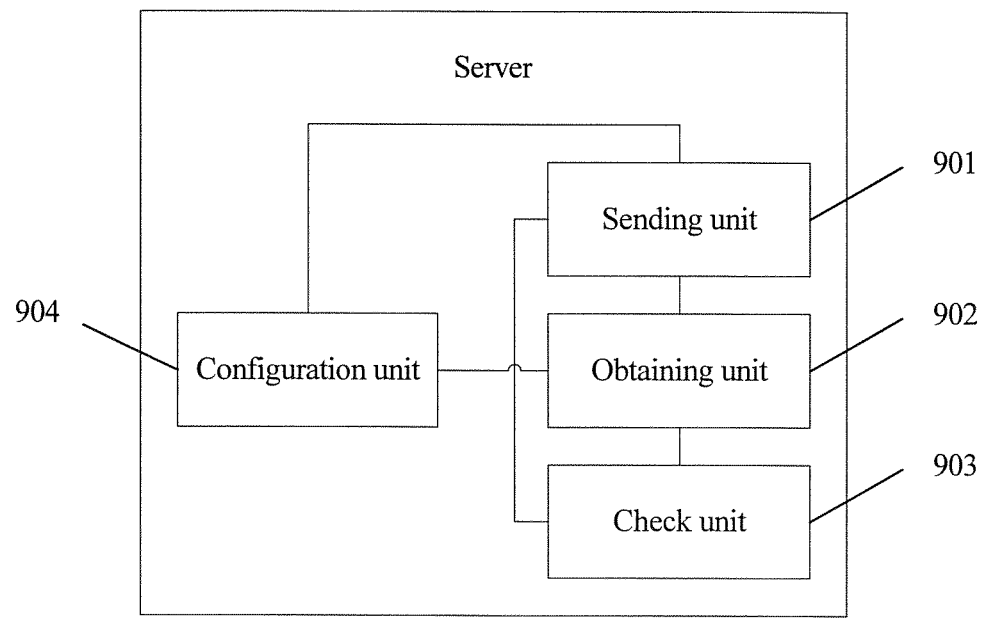
FIG. 10 is a schematic structural diagram of another server according to an embodiment of the present invention.

In this case, referring to FIG. 10, the server may further include:

a configuration unit 904, which may be configured to record the identifier that is of the security subdomain and that is obtained by the obtaining unit 902 in the mobile network operator profile corresponding to the issuer security domain profile identifier.

Still further, optionally, the sending unit 901 may be further configured to send a first update request message to the subscription manager secure routing after the configuration unit 904 records the identifier of the security subdomain in the mobile network operator profile corresponding to the issuer security domain profile identifier.

The first update request message may include configuration information of the mobile network operator profile, so that the subscription manager secure routing updates the configuration information of the mobile network operator profile according to the first update request message, which can synchronize mobile network operator profiles in the subscription manager secure routing, the server, and the communications terminal, where the configuration information of the mobile network operator profile may include type, version, and security subdomain information of the mobile network operator profile.

Optionally, the management request message may include a deletion request message, and the managing a security subdomain may include deleting the security subdomain.

The obtaining unit 902 may be further configured to obtain an identifier of the security subdomain when the first service ends.

That the sending unit 901 may be further configured to send a management request message when the status that is of the mobile network operator profile, included in the query response message, and checked by the check unit 903 is an active state (Enabled), for example, send a management request message to the communications terminal, so that the communications terminal manages a security subdomain according to the management request message, where the configuration request message may include the issuer security domain profile identifier, and the security subdomain may be used to store configuration information of a first service may specifically include:

the sending unit 901 may be configured to send the deletion request message when the status that is of the mobile network operator profile, included in the query response message, and checked by the check unit 903 is an active state, for example, send a deletion request message to the communications terminal, so that the communications terminal deletes the security subdomain according to the management request message, where the deletion request message may include the issuer security domain profile identifier and the identifier of the security subdomain.

Further, optionally, the obtaining unit 902 may be further configured to obtain a saving request message sent by the communications terminal, where the saving request message may include application and data that need to be saved.

Figure 11:
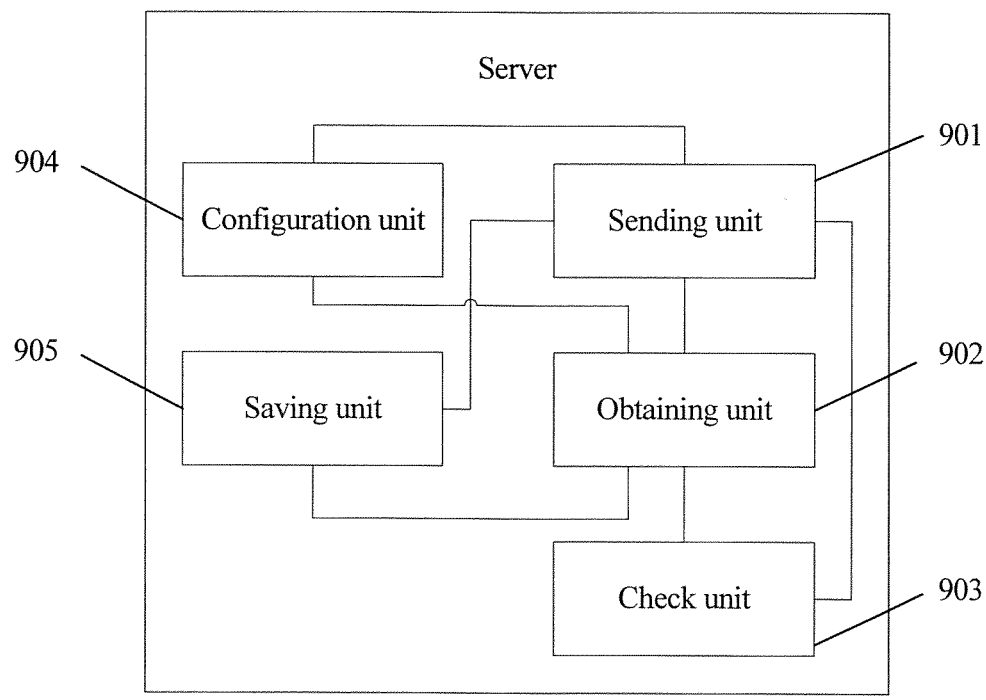
FIG. 11 is a schematic structural diagram of still another server according to an embodiment of the present invention.

In this case, optionally, referring to FIG. 11, the server may further include:

a saving unit 905, which may be configured to save, according to the saving request message obtained by the obtaining unit 902, the application and the data that need to be saved.

Still further, optionally, the obtaining unit 902 may be further configured to obtain a deletion response message, for example, obtain a deletion response message sent by the communications terminal, where the deletion response message may include security subdomain deletion success state information and the identifier of the deleted security subdomain.

In this case, still referring to FIG. 10, the server may further include:

a configuration unit 904, which may be configured to delete an identifier of a security subdomain in the mobile network operator profile according to the security subdomain deletion success state information and the identifier of the deleted security subdomain that are obtained by the obtaining unit 902.

Still further, optionally, the sending unit 901 may be further configured to send a second update request message to the subscription manager secure routing after the configuration unit 904 deletes the identifier of the security subdomain in the mobile network operator profile.

The second update request message may include configuration information of the mobile network operator profile in which the identifier of the security subdomain is deleted by the configuration unit 904, so that the subscription manager secure routing updates the configuration information of the mobile network operator profile according to the second update request message, which can synchronize mobile network operator profiles in the subscription manager secure routing, the server, and the communications terminal.

Optionally, the sending unit 901 may be further configured to send an activation request message when the status that is of the mobile network operator profile, included in the query response message, and checked by the check unit 903 is an inactive state, for example, send an activation request message to the communications terminal.

The obtaining unit 902 may be further configured to obtain an activation response message, for example, obtain an activation response message sent by the communications terminal, where the activation response message may include a status of the mobile network operator profile.

The check unit 903 may be further configured to check the status that is of the mobile network operator profile and that is included in the activation response message obtained by the obtaining unit 902.

The sending unit 901 may be further configured to send the management request message when the status that is of the mobile network operator profile, included in the activation response message, and checked by the check unit 903 is an active state, for example, send the management request message to the communications terminal.

Optionally, when the security domain management system may include a trusted service manager, in this case, the sending unit 901 may be further configured to send a first forwarding request message to the trusted service manager when the first service is being newly subscribed to and the status that is of the mobile network operator profile, included in the query response message, and checked by the check unit 903 is an active state, where the first forwarding request message may include the issuer security domain profile identifier, an integrated circuit card identifier (Integrated Circuit Card ID, ICCID), and the configuration information of the first service, and the configuration information of the first service may include application information and data that are of the first service, so that the trusted service manager performs forwarding to the communications terminal.

In this case, the obtaining unit 902 may be further configured to obtain a first forwarding response message sent by the trusted service manager, where the first forwarding response message may include an identifier of the security subdomain.

Further, optionally, when the first service ends and the security domain management system may include a trusted service manager, the sending unit 901 may be further configured to send a second forwarding request message to the trusted service manager when the status that is of the mobile network operator profile, carried in the query response message, and checked by the check unit 903 is an active state, where the second forwarding request message carries the issuer security domain profile identifier, an integrated circuit card identifier, and an identifier of the security subdomain, so that the trusted service manager performs forwarding to the communications terminal.

The obtaining unit 902 may be further configured to obtain a second forwarding response message sent by the trusted service manager, where the second forwarding response message carries security subdomain deletion success state information and the identifier of the deleted security subdomain.

In this case, the configuration unit 904 may be further configured to delete an identifier of a security subdomain in the mobile network operator profile according to the security subdomain deletion success state information and the identifier of the deleted security subdomain that are obtained by the obtaining unit 902.

According to the server provided in this embodiment of the present invention, the server can send a management request message to a communications terminal, where the management request message may include the issuer security domain profile identifier, and then the communications terminal manages a security subdomain in a mobile network operator profile corresponding to the issuer security domain profile identifier. When the first service is being newly subscribed to, the management request message may include a configuration request message, managing the security subdomain may include creating the security subdomain, the configuration request message may further include configuration information of the first service, and the communications terminal may store the configuration information of the first service in the security subdomain; or when the first service ends, the management request message may include a deletion request message, managing the security subdomain may include deleting the security subdomain, the deletion request message may include an identifier of the security subdomain, and the communications terminal may delete the security subdomain according to the identifier of the security subdomain. Therefore, a security domain that may be used to store the configuration information of the first service can be managed according to a service status of a user-subscribed service.

Figure 12:
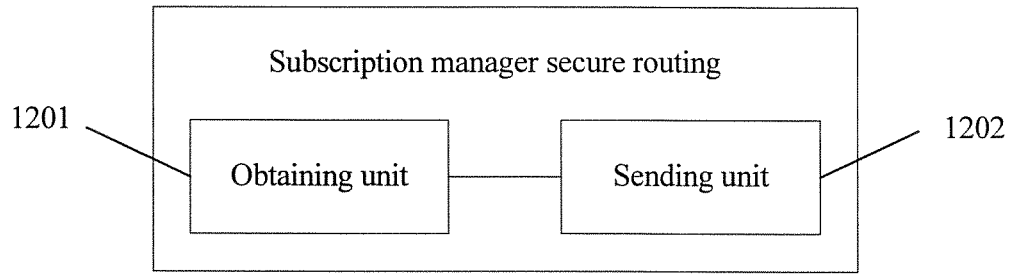
FIG. 12 is a schematic structural diagram of a subscription manager secure routing according to an embodiment of the present invention.

Referring to FIG. 12, an embodiment of the present invention provides a subscription manager secure routing, which may be applied to the communications field, and may be applied to the security domain management system shown in FIG. 1. The subscription manager secure routing may include:

an obtaining unit 1201, which may be configured to obtain a query request message sent by a server, where the query request message may include an identifier of the subscription manager secure routing and an identifier of an embedded integrated circuit card, where the obtaining unit 1201 may be further configured to obtain, according to the identifier that is of the subscription manager secure routing and obtained by the obtaining unit 1201, an issuer security domain profile identifier of the mobile network operator profile corresponding to the identifier of the embedded integrated circuit card, and a status of the mobile network operator profile; and a sending unit 1202, which may be configured to send a query response message to the server, where the query response message may include the issuer security domain profile identifier of the mobile network operator profile and the status of the mobile network operator profile that are obtained by the obtaining unit 1201, so that the server performs security domain management.

Figure 13:
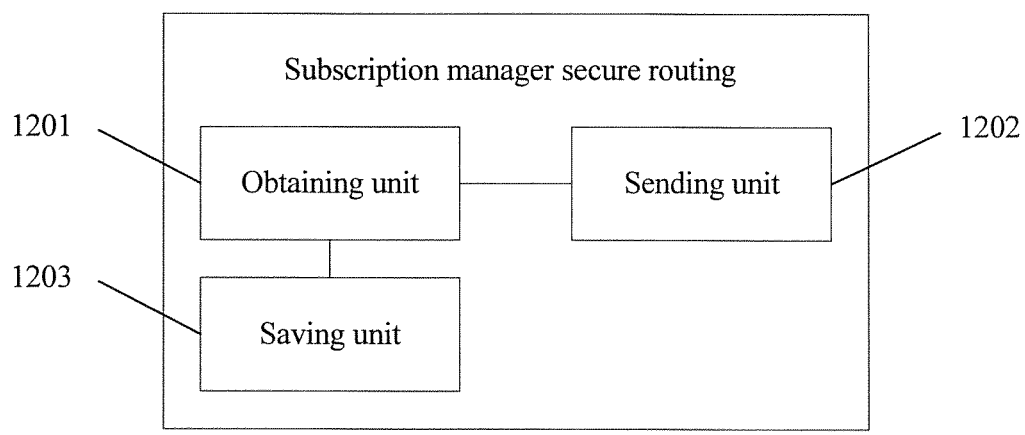
FIG. 13 is a schematic structural diagram of another subscription manager secure routing according to an embodiment of the present invention.

Referring to FIG. 13, optionally, the subscription manager secure routing may further include a saving unit 1203.

The obtaining unit 1201 may be further configured to: when the first service is being newly subscribed to, obtain a first update request message sent by the server, where the first update request message may include configuration information of the mobile network operator profile.

The saving unit 1203 may be configured to update the configuration information of the mobile network operator profile according to the first update request message obtained by the obtaining unit 1201, so as to synchronize mobile network operator profiles in the subscription manager secure routing, the server, and the communications terminal, where the configuration information of the mobile network operator profile may include type, version, and security subdomain information of the mobile network operator profile.

Optionally, still referring to FIG. 13, the obtaining unit 1201 may be further configured to: when the first service ends, obtain a second update request message sent by the server, where the second update request message may include configuration information of the mobile network operator profile in which an identifier of the security subdomain is deleted.

The saving unit 1203 may be further configured to update the configuration information of the mobile network operator profile according to the second update request message obtained by the obtaining unit 1201, so as to synchronize mobile network operator profiles in the subscription manager secure routing, the server, and the communications terminal.

According to this embodiment of the present invention, a subscription manager secure routing obtains a query request message sent by a server; obtains an issuer security domain profile identifier of a mobile network operator profile and a status of the mobile network operator profile according to the query request message; and sends a query response message to the server, where the query response message may include the issuer security domain profile identifier of the mobile network operator profile and the status of the mobile network operator profile, so that the server performs security domain management.

Figure 14:
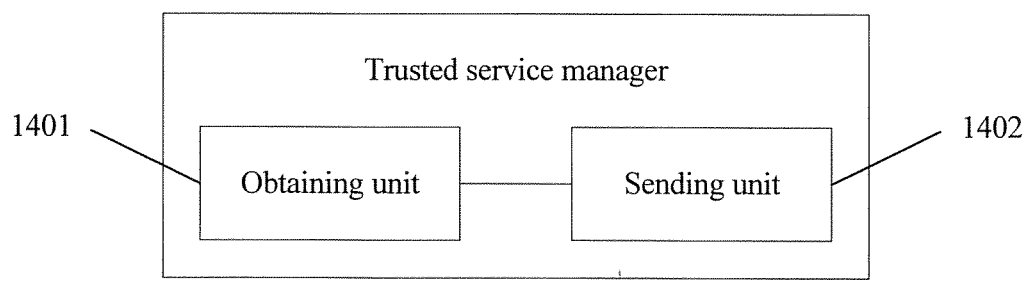
FIG. 14 is a schematic structural diagram of a trusted service manager according to an embodiment of the present invention.

Referring to FIG. 14, an embodiment of the present invention provides a trusted service manager, which may be applied to the communications field, and may be applied to the security domain management system shown in FIG. 1. The subscription manager secure routing may include an obtaining unit 1401 and a sending unit 1402.

The obtaining unit 1401 may be configured to: when the first service is being newly subscribed to, obtain a first forwarding request message sent by a server, where the first forwarding request message may include the issuer security domain profile identifier, an integrated circuit card identifier (Integrated Circuit Card ID, ICCID), and configuration information of the first service, and the configuration information of the first service may include application information and data that are of the first service.

The sending unit 1402 may be configured to send a first connection request message to a communications terminal, where the first connection request message may include the integrated circuit card identifier obtained by the obtaining unit 1401.

The obtaining unit 1401 may be further configured to obtain a first connection response message sent by the communications terminal.

The sending unit 1402 may be further configured to send a first service request message when the obtaining unit 1401 obtains the first connection response message, where the first service request message may include an issuer security domain profile identifier of the mobile network operator profile and the configuration information of the first service, and the configuration information of the first service may include the application and the data that are of the first service, so that the communications terminal configures a security domain for the first service.

The obtaining unit 1401 may be further configured to obtain a first service response message sent by the communications terminal, where the first service response message may include an identifier of a security subdomain.

The sending unit 1402 may be further configured to send a first forwarding response message to the server, where the first forwarding response message may include the identifier that is of the security subdomain and obtained by the obtaining unit 1401.

Optionally, the obtaining unit 1401 may be configured to: when the first service ends, obtain a second forwarding request message sent by the server, where the second forwarding request message may include the issuer security domain profile identifier, an integrated circuit card identifier, and an identifier of the security subdomain.

The sending unit 1402 may be configured to send a second connection request message to the communications terminal, where the second connection request message may include the integrated circuit card identifier obtained by the obtaining unit 1401.

The obtaining unit 1401 may be further configured to obtain a second connection response message sent by the communications terminal.

The sending unit 1402 may be further configured to send a second service request message to the communications terminal when the obtaining unit 1401 obtains the second connection response message, where the second service request message may include the issuer security domain profile identifier and the identifier of the security subdomain, so that the communications terminal deletes the security domain.

The obtaining unit 1401 may be further configured to obtain a second service response message sent by the communications terminal, where the second service response message may include security subdomain deletion success state information and the identifier of the security subdomain deleted by the configuration unit.

The sending unit 1402 may be further configured to send a second forwarding response message to the server, where the second forwarding response message may include the security subdomain deletion success state information and the identifier of the deleted security subdomain that are obtained by the obtaining unit 1401, so that the server updates a mobile network operator profile according to the second forwarding response message.

According to this embodiment of the present invention, a trusted service manager forwards a message of communication between a server and a communications terminal, and assists the server and the communications terminal in managing, in a mobile network operator profile, a security domain that may be used to store configuration information of a first service.

Figure 15:
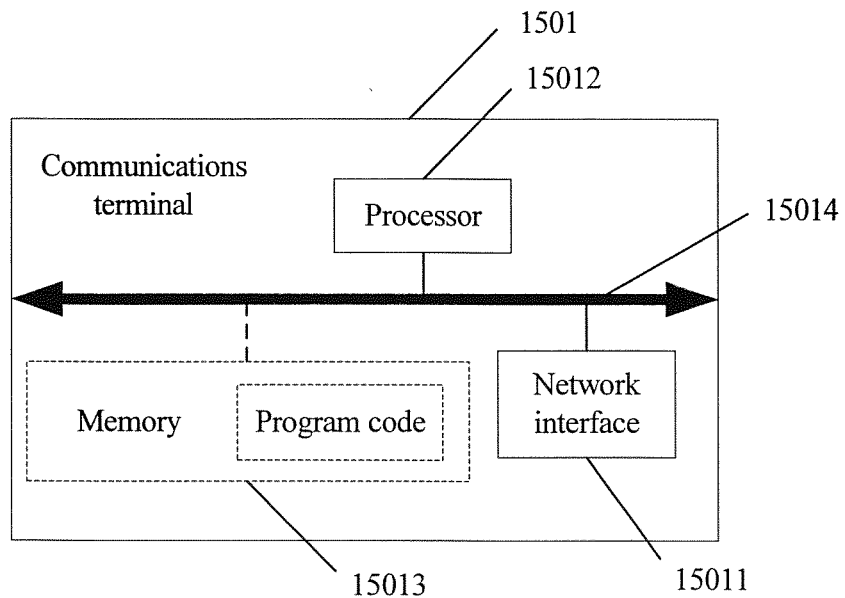
FIG. 15 is a schematic structural diagram of a communications terminal according to another embodiment of the present invention.

An embodiment of the present invention provides a communications terminal, which may be applied to the communications field, and may be applied to the security domain management system shown in FIG. 1. A mobile network operator profile may be preconfigured in the communications terminal. Referring to FIG. 15, the communications terminal may be embedded in a computer with a microprocessor or the communications terminal itself may be a computer with a microprocessor, such as a general-purpose computer, a customized computer, or a portable device like a mobile phone terminal or a tablet, and the communications terminal 1501 may include: at least one network interface 15011, a processor 15012, and a bus 15014, and may further include at least one memory 15013, where the at least one network interface 15011, the processor 15012, and the memory 15013 are connected by using the bus 15014 and communicate with each other.

The bus 15014 may be an ISA (Industry Standard Architecture, industry standard architecture) bus, a PCI (Peripheral Component, peripheral component interconnect) bus, an EISA (Extended Industry Standard Architecture, extended industry standard architecture) bus, or the like. The bus 15014 may be categorized into an address bus, a data bus, a control bus, and the like. For ease of denotation, the bus 15014 is represented by using only one bold line in FIG. 15; however, it does not indicate that there is only one bus or only one type of bus.

The memory 15013 may be configured to store executable program code, where the program code may include a computer operation instruction, and the memory 15013 may include a high-speed RAM memory, and may further include a non-volatile memory (non-volatile memory), for example, at least one magnetic disk memory.

The processor 15012 may be a central processing unit (Central Processing Unit, CPU for short), or an application-specific integrated circuit (Application Specific Integrated Circuit, ASIC for short), or one or more integrated circuits configured to implement this embodiment of the present invention.

The network interface 15011 may be configured to obtain a management request message, for example, obtain a management request message sent by the server, where the management request message may include an issuer security domain profile identifier.

The processor 15012 may be configured to manage a security subdomain in a mobile network operator profile corresponding to the issuer security domain profile identifier that is included in the configuration request message obtained by the network interface 15011, where the security subdomain may be used to store configuration information of a first service.

Optionally, the management request message may include a configuration request message, and the managing a security subdomain may include creating the security subdomain.

The network interface 15011 may be specifically configured to obtain the configuration request message when the first service is being newly subscribed to, for example, obtain a configuration request message sent by the server, where the configuration request message may include the issuer security domain profile identifier and the configuration information of the first service, and the configuration information of the first service may include application and data that are of the first service.

The processor 15012 may be specifically configured to: create the security subdomain in the mobile network operator profile corresponding to the issuer security domain profile identifier that is included in the configuration request message obtained by the network interface 15011, and store the configuration information of the first service in the security subdomain.

The processor 15012 may be further configured to allocate an identifier to the security subdomain created by the processor 15012.

The processor 15012 may be further configured to manage the security subdomain according to the identifier that is of the security subdomain and allocated by the processor 15012 itself.

Further, optionally, the network interface 15011 may be further configured to send a configuration response message to the server, where the configuration response message may include the identifier that is of the security subdomain and allocated by the processor 15012, so that the server manages the security subdomain according to the configuration response message.

Optionally, the management request message may include a deletion request message, and the managing a security subdomain may include deleting the security subdomain.

The network interface 15011 may be specifically configured to obtain the deletion request message when the first service ends, for example, obtain a deletion request message sent by the server, where the deletion request message may include the issuer security domain profile identifier and an identifier of the security subdomain.

The processor 15012 may be specifically configured to delete, according to the issuer security domain profile identifier and the identifier of the security subdomain that are included in the deletion request message obtained by the network interface 15011, the security subdomain in the mobile network operator profile corresponding to the issuer security domain profile identifier.

Still further, optionally, the processor 15012 may be further configured to detect, according to the issuer security domain profile identifier and the identifier of the security subdomain that are included in the deletion request message obtained by the network interface 15011, application and data in the security subdomain that need to be saved.

The network interface 15011 may be further configured to send a saving request message, for example, send a saving request message to the server, where the saving request message may include the application and the data that need to be saved and that are detected by the processor 15012, so that the server saves, according to the saving request message, the application and the data that need to be saved.

The processor 15012 may be specifically configured to: after the network interface 15011 sends the saving request message, delete, according to the issuer security domain profile identifier and the identifier of the security subdomain that are obtained by the network interface 15011, the security subdomain in the mobile network operator profile corresponding to the issuer security domain profile identifier, and the application and the data in the security subdomain.

Further, optionally, the network interface 15011 may be further configured to send a deletion response message after the processor 15012 deletes the security subdomain, for example, send a deletion response message to the server, where the deletion response message may include security subdomain deletion success state information and the identifier of the security subdomain deleted by the processor 15012.

Optionally, the network interface 15011 may be further configured to obtain an activation request message sent by the server.

The network interface 15011 may be further configured to obtain a user instruction according to the activation request message obtained by the network interface 15011.

The processor 15012 may be further configured to change a status of the mobile network operator profile to an active state when the user instruction obtained by the network interface 15011 is an activation instruction.

The network interface 15011 may be further configured to send the activation response message to the server, where the activation response message may include the status that is of the mobile network operator profile and changed by the processor 15012.

Optionally, when the security domain management system may include a trusted service manager, in this case, the network interface 15011 may be configured to: when the first service is being newly subscribed to, obtain a first connection request message sent by the trusted service manager, where the first connection request message may include an integrated circuit card identifier.

The network interface 15011 sends a first connection response message when the integrated circuit card identifier that may be included in the first connection request message obtained by the network interface 15011 matches the communications terminal itself.

The network interface 15011 may be configured to obtain a first service request message sent by the trusted service manager, where the first service request message may include the issuer security domain profile identifier of the mobile network operator profile and the configuration information of the first service, and the configuration information of the first service may include application and data that are of the first service.

The processor 15012 may be configured to create the security subdomain in the mobile network operator profile corresponding to the issuer security domain profile identifier that is included in the first service request message obtained by the network interface 15011, where the security subdomain may be used to store the configuration information of the first service.

The processor 15012 may be configured to allocate an identifier to the security subdomain created by the processor 15012, where the security subdomain may be used to store the configuration information of the first service.

The network interface 15011 may be configured to send a first service response message to the trusted service manager, where the first service response message may include the identifier that is of the security subdomain and allocated by the processor 15012.

Optionally, when the security domain management system may include a trusted service manager, in this case, the network interface 15011 may be configured to: when the first service ends, obtain a second connection request message sent by the trusted service manager, where the second connection request message may include an integrated circuit card identifier.

The network interface 15011 sends a second connection response message when the integrated circuit card identifier that may be included in the second connection request message obtained by the network interface 15011 matches the communications terminal itself.

The network interface 15011 may be further configured to obtain a second service request message sent by the trusted service manager, where the second service request message may include the issuer security domain profile identifier and an identifier of the security subdomain.

The processor 15012 may be further configured to delete, according to the issuer security domain profile identifier and the identifier of the security subdomain that are included in the second service request message obtained by the network interface 15011, the security subdomain in the mobile network operator profile corresponding to the issuer security domain profile identifier.

The network interface 15011 may be further configured to send a second service response message to the trusted service manager after the processor 15012 deletes the security subdomain, where the second service response message may include security subdomain deletion success state information and the identifier of the security subdomain deleted by the processor 15012.

According to the communications terminal provided in this embodiment of the present invention, the communications terminal can obtain a management request message sent by a server, where the management request message may include the issuer security domain profile identifier; and then the communications terminal manages a security subdomain in a mobile network operator profile corresponding to the issuer security domain profile identifier. When the first service is being newly subscribed to, the management request message may include a configuration request message, managing the security subdomain may include creating the security subdomain, the configuration request message may further include configuration information of the first service, and the communications terminal may store the configuration information of the first service in the security subdomain; or when the first service ends, the management request message may include a deletion request message, managing the security subdomain may include deleting the security subdomain, the deletion request message may include an identifier of the security subdomain, and the communications terminal may delete the security subdomain according to the identifier of the security subdomain. Therefore, according to the security domain management method, apparatus, and system provided in the present invention, a security domain that may be used to store the configuration information of the first service can be managed according to a service status of a user-subscribed service.

Figure 16:
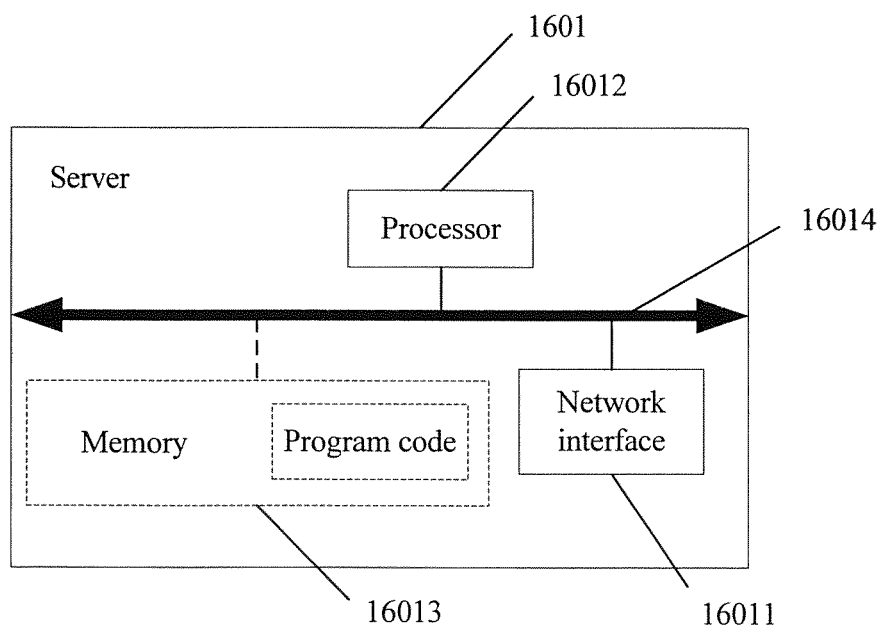
FIG. 16 is a schematic structural diagram of a server according to another embodiment of the present invention.

An embodiment of the present invention provides a server, which may be applied to the communications field, and may be applied to the security domain management system shown in FIG. 1. A mobile network operator profile may be preconfigured on the server. Referring to FIG. 16, the server may be embedded in a computer with a microprocessor or the server itself may be a computer with a microprocessor, such as a general-purpose computer, a customized computer, or a portable device like a mobile phone terminal or a tablet, and the server 1601 may include: at least one network interface 16011, a processor 16012, and a bus 16014, and may further include at least one memory 16013, where the at least one network interface 16011, the processor 16012, and the memory 16013 are connected by using the bus 16014 and communicate with each other.

The bus 16014 may be an ISA (Industry Standard Architecture, industry standard architecture) bus, a PCI (Peripheral Component, peripheral component interconnect) bus, an EISA (Extended Industry Standard Architecture, extended industry standard architecture) bus, or the like. The bus 16014 may be categorized into an address bus, a data bus, a control bus, and the like. For ease of denotation, the bus 16014 is represented by using only one bold line in FIG. 16; however, it does not indicate that there is only one bus or only one type of bus.

The memory 16013 may be configured to store executable program code, where the program code may include a computer operation instruction, and the memory 16013 may include a high-speed RAM memory, and may further include a non-volatile memory (non-volatile memory), for example, at least one magnetic disk memory.

The processor 16012 may be a central processing unit (Central Processing Unit, CPU for short), or an application-specific integrated circuit (Application Specific Integrated Circuit, ASIC for short), or one or more integrated circuits configured to implement this embodiment of the present invention.

The network interface 16011 may be configured to send a query request message to a subscription manager secure routing, where the query request message may include an identifier of the subscription manager secure routing and an identifier of an embedded integrated circuit card.

The network interface 16011 may be further configured to obtain a query response message sent by the subscription manager secure routing, where the query response message may include an issuer security domain profile identifier of the mobile network operator profile and a status of the mobile network operator profile.

The processor 16012 may be configured to check the status that is of the mobile network operator profile and that is included in the query response message obtained by the network interface 16011.

The network interface 16011 may be further configured to send a management request message when the status that is of the mobile network operator profile, included in the query response message, and checked by the processor 16012 is an active state, for example, send a management request message to the communications terminal, so that the communications terminal manages a security subdomain according to the management request message, where the configuration request message may include the issuer security domain profile identifier, and the security subdomain may be used to store configuration information of a first service.

Optionally, the management request message may include a configuration request message, and the managing a security subdomain may include creating the security subdomain.

That the network interface 16011 may be further configured to send a management request message when the status that is of the mobile network operator profile, included in the query response message, and checked by the processor 16012 is an active state, for example, send a management request message to the communications terminal, so that the communications terminal manages a security subdomain according to the management request message, where the configuration request message may include the issuer security domain profile identifier, and the security subdomain may be used to store configuration information of a first service may specifically include:

the network interface 16011 may be configured to send the configuration request message when the first service is being newly subscribed to and the status that is of the mobile network operator profile, included in the query response message, and checked by the processor 16012 is an active state, for example, send a configuration request message to the communications terminal, so that the communications terminal creates the security subdomain according to the management request message, where the configuration request message may include the issuer security domain profile identifier and the configuration information of the first service, and the configuration information of the first service may include application information and data that are of the first service.

Further, optionally, the network interface 16011 may be further configured to obtain a configuration response message, for example, obtain a configuration response message sent by the communications terminal, where the configuration response message may include an identifier of the security subdomain.

The processor 16012 may be further configured to record the identifier that is of the security subdomain and that is obtained by the network interface 16011 in the mobile network operator profile corresponding to the issuer security domain profile identifier.

Still further, optionally, the network interface 16011 may be further configured to send a first update request message to the subscription manager secure routing after the processor 16012 records the identifier of the security subdomain in the mobile network operator profile corresponding to the issuer security domain profile identifier.

The first update request message may include configuration information of the mobile network operator profile, so that the subscription manager secure routing updates the configuration information of the mobile network operator profile according to the first update request message, which can synchronize mobile network operator profiles in the subscription manager secure routing, the server, and the communications terminal, where the configuration information of the mobile network operator profile may include type, version, and security subdomain information of the mobile network operator profile.

Optionally, in a fourth possible implementation manner, the management request message may include a deletion request message, and the managing a security subdomain may include deleting the security subdomain.

The network interface 16011 may be further configured to obtain an identifier of the security subdomain when the first service ends.

That the network interface 16011 may be further configured to send a management request message when the status that is of the mobile network operator profile, included in the query response message, and checked by the processor 16012 is an active state, for example, send a management request message to the communications terminal, so that the communications terminal manages a security subdomain according to the management request message, where the configuration request message may include the issuer security domain profile identifier, and the security subdomain may be used to store configuration information of a first service may specifically include:

the network interface 16011 may be configured to send the deletion request message when the status that is of the mobile network operator profile, included in the query response message, and checked by the processor 16012 is an active state, for example, send a deletion request message to the communications terminal, so that the communications terminal deletes the security subdomain according to the management request message, where the deletion request message may include the issuer security domain profile identifier and the identifier of the security subdomain.

Further, optionally, the network interface 16011 may be further configured to obtain a saving request message sent by the communications terminal, where the saving request message may include application and data that need to be saved.

The memory 16013 may be further configured to save, according to the saving request message obtained by the network interface, the application and the data that need to be saved.

Still further, optionally, the network interface 16011 may be further configured to obtain a deletion response message, for example, obtain a deletion response message sent by the communications terminal, where the deletion response message may include security subdomain deletion success state information and the identifier of the deleted security subdomain.

The processor 16012 may be further configured to delete an identifier of a security subdomain in the mobile network operator profile according to the security subdomain deletion success state information and the identifier of the deleted security subdomain that are obtained by the network interface 16011.

Still further, optionally, the network interface 16011 may be further configured to send a second update request message to the subscription manager secure routing after the processor 16012 deletes the identifier of the security subdomain in the mobile network operator profile.

The second update request message may include configuration information of the mobile network operator profile in which the identifier of the security subdomain is deleted by the processor 16012, so that the subscription manager secure routing updates the configuration information of the mobile network operator profile according to the second update request message, which can synchronize mobile network operator profiles in the subscription manager secure routing, the server, and the communications terminal.

Optionally, the network interface 16011 may be further configured to send an activation request message to the communications terminal when the status that is of the mobile network operator profile, included in the query response message, and checked by the processor 16012 is an inactive state.

The network interface 16011 may be further configured to obtain an activation response message sent by the communications terminal, where the activation response message may include a status of the mobile network operator profile.

The processor 16012 may be further configured to check the status that is of the mobile network operator profile and that is included in the activation response message obtained by the network interface 16011.

The network interface 16011 may be further configured to send the management request message to the communications terminal when the status that is of the mobile network operator profile, included in the activation response message, and checked by the processor 16012 is an active state.

Optionally, when the security domain management system may include a trusted service manager, in this case, the network interface 16012 may be further configured to send a first forwarding request message to the trusted service manager when the first service is being newly subscribed to and the status that is of the mobile network operator profile, included in the query response message, and checked by the check unit is an active state, where the first forwarding request message may include the issuer security domain profile identifier, an integrated circuit card identifier (Integrated Circuit Card ID, ICCID), and the configuration information of the first service, and the configuration information of the first service may include application information and data that are of the first service, so that the trusted service manager performs forwarding to the communications terminal.

In this case, the network interface 16012 may be further configured to obtain a first forwarding response message sent by the trusted service manager, where the first forwarding response message may include an identifier of the security subdomain.

The processor 16012 may be configured to record the identifier that is of the security subdomain and that is obtained by the network interface 16012 in the mobile network operator profile corresponding to the issuer security domain profile identifier.

Optionally, when the security domain management system may include a trusted service manager, the network interface 16012 may be further configured to send a second forwarding request message to the trusted service manager when the first service ends and the status that is of the mobile network operator profile, included in the query response message, and checked by the check unit is an active state, where the second forwarding request message may include the issuer security domain profile identifier, an integrated circuit card identifier, and an identifier of the security subdomain, so that the trusted service manager performs forwarding to the communications terminal.

The network interface 16012 may be further configured to obtain a second forwarding response message sent by the trusted service manager, where the second forwarding response message may include security subdomain deletion success state information and the identifier of the deleted security subdomain.

The processor 16012 may be further configured to delete an identifier of a security subdomain in the mobile network operator profile according to the security subdomain deletion success state information and the identifier of the deleted security subdomain that are obtained by the network interface 16012.

According to this embodiment of the present invention, the server obtains an issuer security domain profile identifier of the mobile network operator profile and a status of the mobile network operator profile in a manner of sending a query request message to a subscription manager secure routing; when the status of the mobile network operator profile is an active state, sends a configuration request message to the communications terminal to obtain a configuration response message, where the configuration request message may include the issuer security domain profile identifier and configuration information of the first service, and the configuration response message may include an identifier of a security subdomain; and finally, records the identifier of the security subdomain in the mobile network operator profile corresponding to the issuer security domain profile identifier. Therefore, configuration information and a security domain that are related to a newly subscribed service can be added to a mobile network operator profile of the communications terminal when a user newly subscribes to the service, to manage a security domain that may be used to store the configuration information of the first service.

Figure 17:
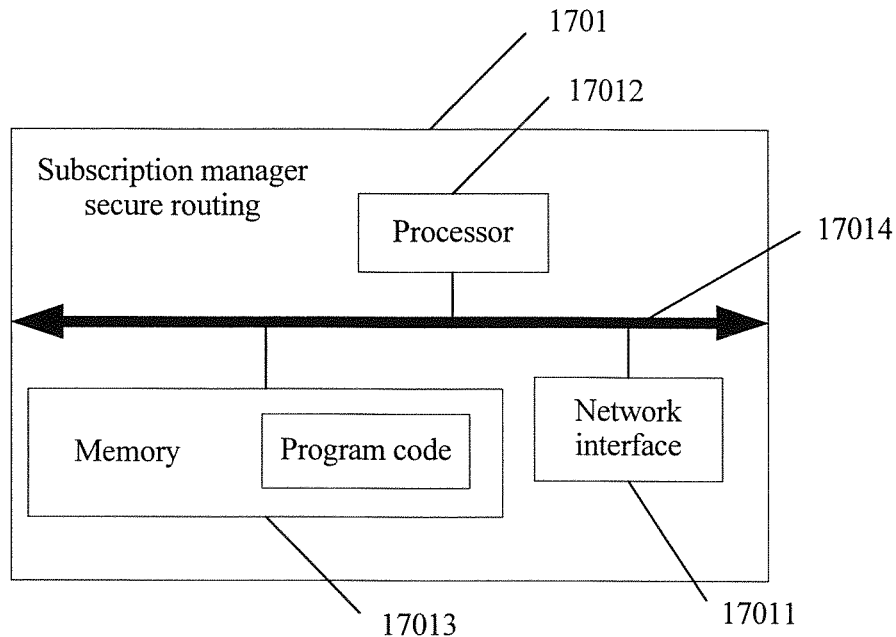
FIG. 17 is a schematic structural diagram of a subscription manager secure routing according to another embodiment of the present invention.

An embodiment of the present invention provides a subscription manager secure routing, which may be applied to the communications field, and may be applied to the security domain management system shown in FIG. 1. Referring to FIG. 17, the subscription manager secure routing may be embedded in a computer with a microprocessor or the subscription manager secure routing itself may be a computer with a microprocessor, such as a general-purpose computer, a customized computer, or a portable device like a mobile phone terminal or a tablet, and the subscription manager secure routing 1701 may include: at least one network interface 17011, a processor 17012, a memory 17013, and a bus 17014, where the at least one network interface 17011, the processor 17012, and the memory 17013 are connected by using the bus 17014 and communicate with each other.

The bus 17014 may be an ISA (Industry Standard Architecture, industry standard architecture) bus, a PCI (Peripheral Component, peripheral component interconnect) bus, an EISA (Extended Industry Standard Architecture, extended industry standard architecture) bus, or the like. The bus 17014 may be categorized into an address bus, a data bus, a control bus, and the like. For ease of denotation, the bus 17014 is represented by using only one bold line in FIG. 17; however, it does not indicate that there is only one bus or only one type of bus.

The memory 17013 may be configured to store executable program code, where the program code may include a computer operation instruction, and the memory 17013 may include a high-speed RAM memory, and may further include a non-volatile memory (non-volatile memory), for example, at least one magnetic disk memory.

The processor 17012 may be a central processing unit (Central Processing Unit, CPU for short), or an application-specific integrated circuit (Application Specific Integrated Circuit, ASIC for short), or one or more integrated circuits configured to implement this embodiment of the present invention.

The network interface 17011 may be configured to obtain a query request message sent by a server, where the query request message may include an identifier of the subscription manager secure routing and an identifier of an embedded integrated circuit card.

The network interface 17011 may be further configured to obtain, according to the identifier that is of the subscription manager secure routing and obtained by the network interface 17011, an issuer security domain profile identifier of the mobile network operator profile corresponding to the identifier of the embedded integrated circuit card, and a status of the mobile network operator profile.

The network interface 17011 may be configured to send a query response message to the server, where the query response message may include the issuer security domain profile identifier of the mobile network operator profile and the status of the mobile network operator profile that are obtained by the network interface 17011, so that the server performs security domain management.

Optionally, the network interface 17011 may be further configured to: when the first service is being newly subscribed to, obtain a first update request message sent by the server, where the first update request message may include configuration information of the mobile network operator profile.

The processor 17012 may be configured to update the configuration information of the mobile network operator profile according to the first update request message obtained by the network interface 17011, so as to synchronize mobile network operator profiles in the subscription manager secure routing, the server, and the communications terminal, where the configuration information of the mobile network operator profile may include type, version, and security subdomain information of the mobile network operator profile.

Optionally, the network interface 17011 may be further configured to: when the first service ends, obtain a second update request message sent by the server, where the second update request message may include configuration information of the mobile network operator profile in which an identifier of the security subdomain is deleted.

The processor 17012 may be further configured to update the configuration information of the mobile network operator profile according to the second update request message obtained by the network interface 17011, so as to synchronize mobile network operator profiles in the subscription manager secure routing, the server, and the communications terminal.

According to this embodiment of the present invention, a subscription manager secure routing obtains a query request message sent by a server; obtains an issuer security domain profile identifier of a mobile network operator profile and a status of the mobile network operator profile according to the query request message; and sends a query response message to the server, where the query response message may include the issuer security domain profile identifier of the mobile network operator profile and the status of the mobile network operator profile, so that the server performs security domain management.

Figure 18:
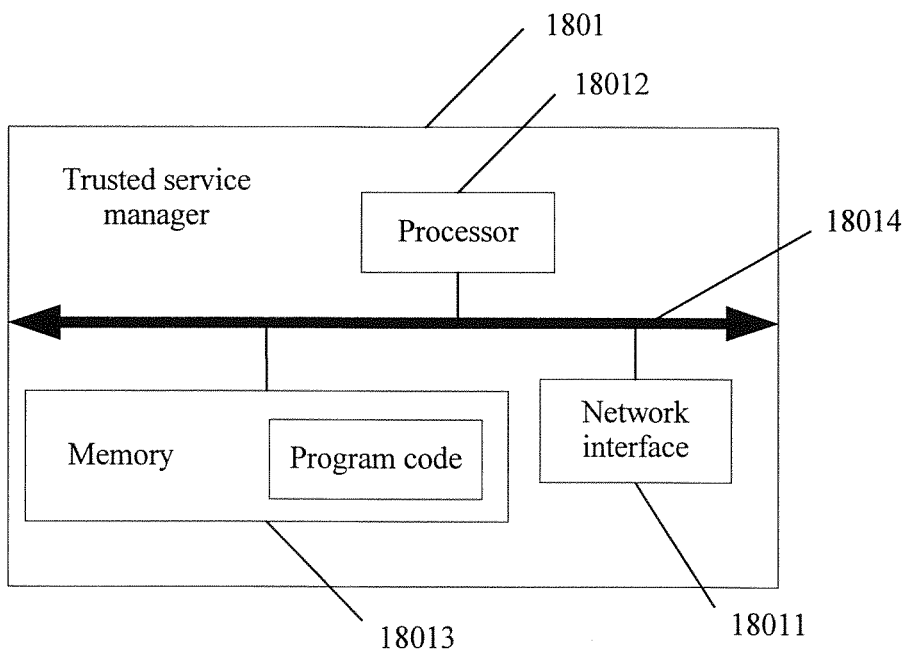
FIG. 18 is a schematic structural diagram of a trusted service manager according to another embodiment of the present invention.

An embodiment of the present invention provides a trusted service manager, which may be applied to the communications field, and may be applied to the security domain management system shown in FIG. 1. Referring to FIG. 18, the trusted service manager may be embedded in a computer with a microprocessor or the trusted service manager itself may be a computer with a microprocessor, such as a general-purpose computer, a customized computer, or a portable device like a mobile phone terminal or a tablet, and the trusted service manager 1801 may include: at least one network interface 18011, a processor 18012, a memory 18013, and a bus 18014, where the at least one network interface 18011, the processor 18012, and the memory 18013 are connected by using the bus 18014 and communicate with each other.

The bus 18014 may be an ISA (Industry Standard Architecture, industry standard architecture) bus, a PCI (Peripheral Component, peripheral component interconnect) bus, an EISA (Extended Industry Standard Architecture, extended industry standard architecture) bus, or the like. The bus 18014 may be categorized into an address bus, a data bus, a control bus, and the like. For ease of denotation, the bus 18014 is represented by using only one bold line in FIG. 18; however, it does not indicate that there is only one bus or only one type of bus.

The memory 18013 may be configured to store executable program code, where the program code may include a computer operation instruction; and the memory 18013 may include a high-speed RAM memory, and may further include a non-volatile memory (non-volatile memory), for example, at least one magnetic disk memory.

The processor 18012 may be a central processing unit (Central Processing Unit, CPU for short), or an application-specific integrated circuit (Application Specific Integrated Circuit, ASIC for short), or one or more integrated circuits configured to implement this embodiment of the present invention.

Optionally, the network interface 18011 may be configured to: when the first service is being newly subscribed to, obtain a first forwarding request message sent by a server, where the first forwarding request message may include the issuer security domain profile identifier, an integrated circuit card identifier (Integrated Circuit Card ID, ICCID), and configuration information of the first service, and the configuration information of the first service may include application information and data that are of the first service.

The network interface 18011 may be configured to send a first connection request message to a communications terminal, where the first connection request message may include the integrated circuit card identifier obtained by the network interface 18011.

The network interface 18011 may be further configured to obtain a first connection response message sent by the communications terminal.

The network interface 18011 may be further configured to send a first service request message when the network interface 18011 obtains the first connection response message, where the first service request message may include an issuer security domain profile identifier of the mobile network operator profile and the configuration information of the first service, and the configuration information of the first service may include the application and the data that are of the first service, so that the communications terminal configures a security domain for the first service.

The network interface 18011 may be further configured to obtain a first service response message sent by the communications terminal, where the first service response message may include an identifier of a security subdomain.

The network interface 18011 may be further configured to send a first forwarding response message to the server, where the first forwarding response message may include the identifier that is of the security subdomain and obtained by the network interface 18011.

Optionally, the network interface 18011 may be configured to: when the first service ends, obtain a second forwarding request message sent by the server, where the second forwarding request message may include the issuer security domain profile identifier, an integrated circuit card identifier, and an identifier of the security subdomain.

The network interface 18011 may be further configured to send a second connection request message to the communications terminal, where the second connection request message may include the integrated circuit card identifier obtained by the network interface 18011.

The network interface 18011 may be further configured to obtain a second connection response message sent by the communications terminal.

The network interface 18011 may be further configured to send a second service request message to the communications terminal when the network interface 18011 obtains the second connection response message, where the second service request message may include the issuer security domain profile identifier and the identifier of the security subdomain, so that the communications terminal deletes the security domain.

The network interface 18011 may be further configured to obtain a second service response message sent by the communications terminal, where the second service response message may include security subdomain deletion success state information and the identifier of the security subdomain deleted by the configuration unit.

The network interface 18011 may be further configured to send a second forwarding response message to the server, where the second forwarding response message may include the security subdomain deletion success state information and the identifier of the deleted security subdomain that are obtained by the network interface 18011, so that the server updates a mobile network operator profile according to the second forwarding response message.

According to this embodiment of the present invention, a trusted service manager forwards a message of communication between a server and a communications terminal, and assists the server and the communications terminal in managing, in a mobile network operator profile, a security domain that may be used to store configuration information of a first service.

According to the descriptions of the foregoing implementation manners, a person skilled in the art can clearly understand that the present invention may be implemented by using hardware, firmware, or a combination thereof. When the present invention is implemented by using software, the foregoing functions may be stored in a computer readable medium, or may be transmitted as one or more instructions or code in a computer readable medium. The computer readable medium may include a computer storage medium and a communications medium, where the communications medium may include any medium that facilitates transmission of a computer program from one place to another. The storage medium may be any available medium that can be accessed by a computer. The following is taken as an example instead of a limitation: The computer readable medium may include a RAM (Random Access Memory, random access memory), a ROM (Read Only Memory, read-only memory), an EEPROM (Electrically Erasable Programmable Read Only Memory, electrically erasable programmable read-only memory), a CD-ROM (Compact Disc Read Only Memory, compact disc read-only memory) or another optical disc storage medium, a magnetic disk storage medium or another magnetic storage device, or any other medium that can be used to include or store expected program code in a form of an instruction or a data structure and can be accessed by a computer. In addition, any connection may be properly referred to as a computer readable medium. For example, if software is transmitted from a website, a server or another remote source by using a coaxial cable, an optical fiber cable, a twisted pair, a DSL (Digital Subscriber Line, digital subscriber line), or wireless technologies such as infrared ray, radio, and microwave, the coaxial cable, the optical fiber cable, the twisted pair, the DSL, or the wireless technologies such as infrared ray, radio, and microwave may be included in fixation of the medium. A disk and a disc used in the present invention may include a CD (Compact Disc, compact disc), a laser disc, an optical disc, a DVD (Digital Versatile Disc, digital versatile disc), a floppy disk, and a Blu-ray disc, where the disk generally replicates data by a magnetic means, and the disc replicates data optically by a laser means. The foregoing combination should also be included in the protection scope of the computer readable medium.

Figure 19:
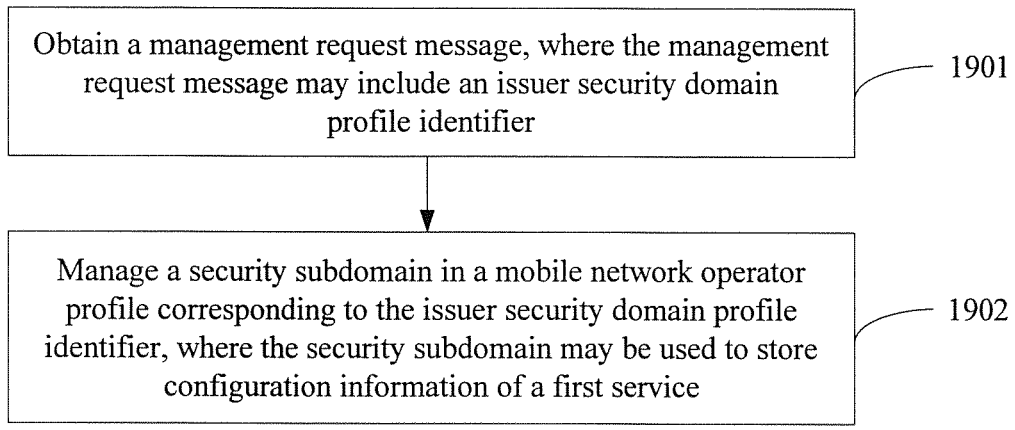
FIG. 19 is a schematic flowchart of a security domain management method according to an embodiment of the present invention.

An embodiment of the present invention provides a security domain management method, which may be applied to the communications field, and may be applied to a communications terminal in the security domain management system shown in FIG. 1. A mobile network operator profile may be preconfigured in the communications terminal. Referring to FIG. 19, the method may include the following steps:

1901. Obtain a management request message, where the management request message may include an issuer security domain profile identifier.

1902. Manage a security subdomain in a mobile network operator profile corresponding to the issuer security domain profile identifier, where the security subdomain may be used to store configuration information of the first service.

Optionally, the management request message may include a configuration request message, the managing a security subdomain may include creating the security subdomain, the configuration request message may further include the configuration information of the first service, and when the first service is being newly subscribed to, the configuration information of the first service may be stored in the security subdomain.

Optionally, the management request message may include a deletion request message, the managing a security subdomain may include deleting the security subdomain, the deletion request message may include an identifier of the security subdomain, and when the first service ends, the security subdomain may be deleted according to the identifier of the security subdomain.

According to the communications terminal provided in this embodiment of the present invention, the communications terminal can obtain a management request message sent by a server, where the management request message may include the issuer security domain profile identifier; and then the communications terminal manages a security subdomain in a mobile network operator profile corresponding to the issuer security domain profile identifier. Therefore, a security domain that may be used to store configuration information of a first service can be managed according to a service status of a user-subscribed service.

Figure 20:
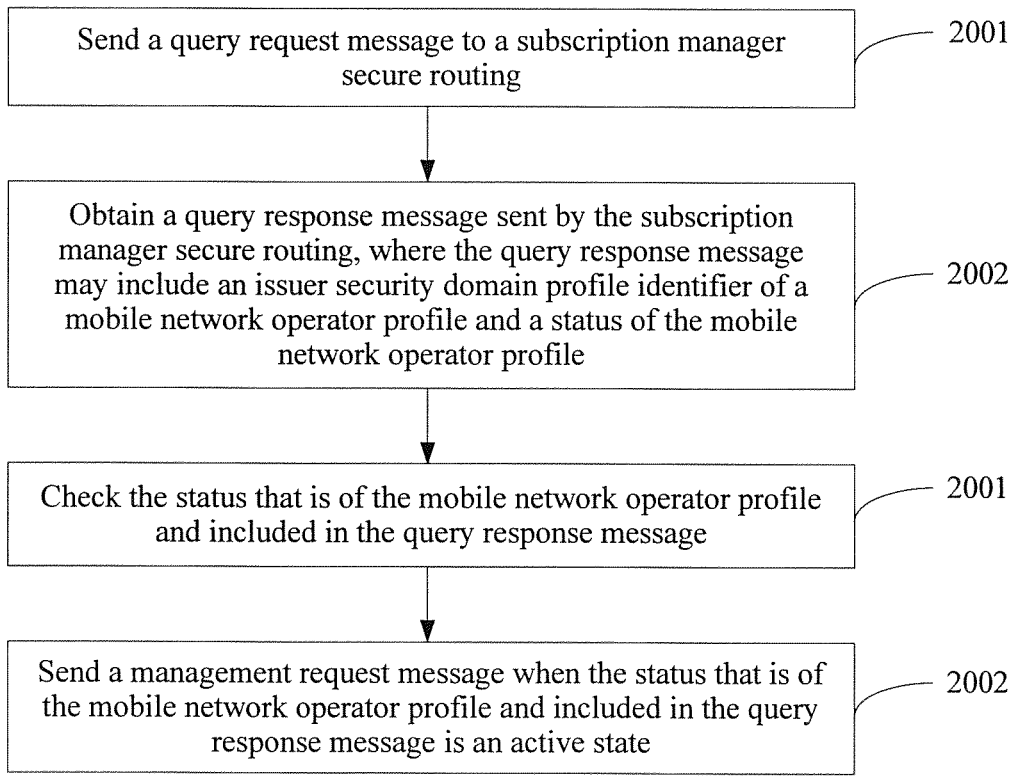
FIG. 20 is a schematic flowchart of a security domain management method according to another embodiment of the present invention.

An embodiment of the present invention provides a security domain management method, which may be applied to the communications field, and may be applied to a server in the security domain management system shown in FIG. 1. A mobile network operator profile may be preconfigured on the server. Referring to FIG. 20, the method may include the following steps:

2001. Send a query request message to a subscription manager secure routing.

The query request message may include an identifier of the subscription manager secure routing and an identifier of an embedded integrated circuit card.

2002. Obtain a query response message sent by the subscription manager secure routing, where the query response message may include an issuer security domain profile identifier of the mobile network operator profile and a status of the mobile network operator profile.

2003. Check the status that is of the mobile network operator profile and included in the query response message.

2004. Send a management request message when the status that is of the mobile network operator profile and included in the query response message is an active state.

Specifically, a management request message may be sent to the communications terminal, so that the communications terminal manages a security subdomain according to the management request message.

The configuration request message may include the issuer security domain profile identifier, and the security subdomain may be used to store configuration information of a first service.

Optionally, the management request message may include a configuration request message, the managing a security subdomain may include creating the security subdomain, the configuration request message may further include the configuration information of the first service, and when the first service is being newly subscribed to, the configuration information of the first service may be stored in the security subdomain.

Optionally, the management request message may include a deletion request message, the managing a security subdomain may include deleting the security subdomain, the deletion request message may include an identifier of the security subdomain, and when the first service ends, the security subdomain may be deleted according to the identifier of the security subdomain.

According to the server provided in this embodiment of the present invention, the server can send a management request message to a communications terminal, where the management request message may include the issuer security domain profile identifier; and then the communications terminal manages a security subdomain in a mobile network operator profile corresponding to the issuer security domain profile identifier. Therefore, a security domain that may be used to store configuration information of a first service can be managed according to a service status of a user-subscribed service.

Figure 21:
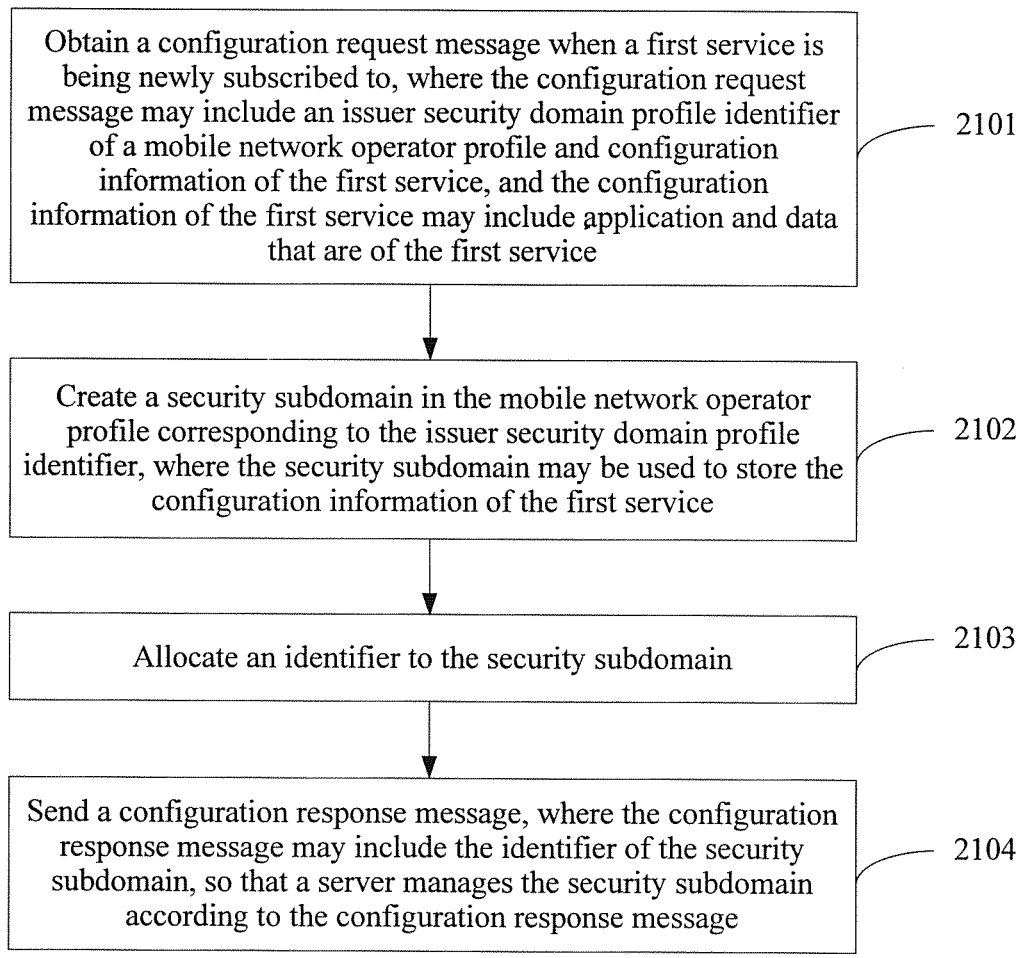
FIG. 21 is a schematic flowchart of a security domain management method according to still another embodiment of the present invention.
Figure 22:
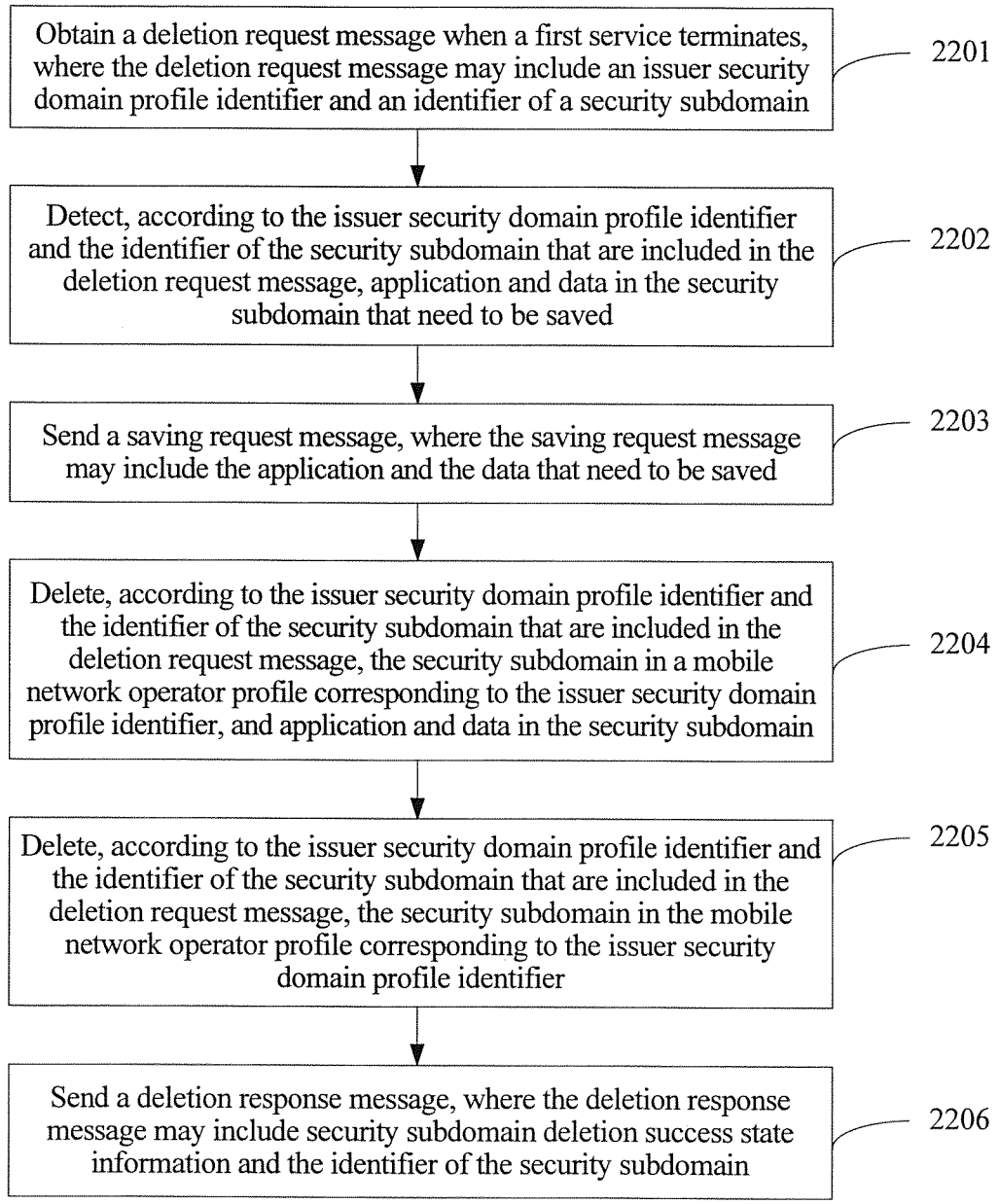
FIG. 22 is a schematic flowchart of another security domain management method according to still another embodiment of the present invention.

On a basis of the embodiment shown in FIG. 19, an embodiment of the present invention provides a security domain management method, which may be applied to the communications field, and may be applied to a communications terminal in the security domain management system shown in FIG. 1. A mobile network operator profile may be preconfigured in the communications terminal. Referring to FIG. 21 and FIG. 22, the method may include the following steps:

First, referring to FIG. 21, the management request message may include a configuration request message, and the managing a security subdomain may include creating the security subdomain.

2101. Obtain the configuration request message when the first service is being newly subscribed to, where the configuration request message may include an issuer security domain profile identifier of the mobile network operator profile and configuration information of the first service, and the configuration information of the first service may include application and data that are of the first service.

Specifically, a configuration request message sent by the server may be obtained.

This step is one of specific implementation manners of the following content: obtaining a management request message, where the management request message may include an issuer security domain profile identifier.

2102. Create the security subdomain in the mobile network operator profile corresponding to the issuer security domain profile identifier, where the security subdomain may be used to store the configuration information of the first service.

Specifically, this step is one of specific implementation manners of the following content: managing a security subdomain in a mobile network operator profile corresponding to the issuer security domain profile identifier, where the security subdomain may be used to store configuration information of the first service.

2103. Allocate an identifier to the security subdomain.

Optionally, after step 2103 is performed, the security subdomain may be further managed according to the identifier of the security subdomain.

2104. Send a configuration response message, where the configuration response message may include the identifier of the security subdomain, so that the server manages the security subdomain according to the configuration response message.

Specifically, a configuration response message may be sent to the server.

Optionally, referring to FIG. 22, the management request message may include a deletion request message, and the managing a security subdomain may include deleting the security subdomain.

2201. Obtain the deletion request message when the first service ends, where the deletion request message may include the issuer security domain profile identifier and an identifier of the security subdomain.

Specifically, a deletion request message sent by the server may be obtained.

This step is one of specific implementation manners of the following content: obtaining the management request message, where the management request message may include an issuer security domain profile identifier.

2202. Detect, according to the issuer security domain profile identifier and the identifier of the security subdomain that are included in the deletion request message, application and data in the security subdomain that need to be saved.

2203. Send a saving request message, where the saving request message may include the application and the data that need to be saved.

Specifically, a saving request message may be sent to the server, so that the server saves, according to the saving request message, the application and the data that need to be saved.

After the saving request message is sent, the following step is performed.

2204. Delete, according to the issuer security domain profile identifier and the identifier of the security subdomain that are included in the deletion request message, the security subdomain in the mobile network operator profile corresponding to the issuer security domain profile identifier, and the application and the data in the security subdomain.

Specifically, this step is one of specific implementation manners of the following content: deleting, according to the issuer security domain profile identifier and the identifier of the security subdomain that are included in the deletion request message, the security subdomain in the mobile network operator profile corresponding to the issuer security domain profile identifier.

2205. Delete, according to the issuer security domain profile identifier and the identifier of the security subdomain that are included in the deletion request message, the security subdomain in the mobile network operator profile corresponding to the issuer security domain profile identifier.

Specifically, this step is one of specific implementation manners of managing a security subdomain in a mobile network operator profile corresponding to the issuer security domain profile identifier, where the security subdomain may be used to store configuration information of the first service.

After the security subdomain is deleted, the following step is performed.

2206. Send a deletion response message, where the deletion response message may include security subdomain deletion success state information and the identifier of the security subdomain.

Specifically, a deletion response message may be sent to the server.

Optionally, for the foregoing steps of this embodiment, before the obtaining a management request message, the method may further include the following steps:

A1. Obtain an activation request message.

Specifically, an activation request message sent by the server may be obtained.

A2. Obtain a user instruction according to the activation request message.

A3. Change a status of the mobile network operator profile to an active state when the user instruction is an activation instruction.

A4. Send the activation response message, where the activation response message may include the status of the mobile network operator profile.

Specifically, the activation response message may be sent to the server.

According to the communications terminal provided in this embodiment of the present invention, the communications terminal can obtain a management request message sent by a server, where the management request message may include the issuer security domain profile identifier; and then the communications terminal manages a security subdomain in a mobile network operator profile corresponding to the issuer security domain profile identifier. The management request message may include a configuration request message, managing the security subdomain may include creating the security subdomain, the configuration request message may further include configuration information of a first service, and when the first service is being newly subscribed to, the configuration information of the first service may be stored in the security subdomain; or the management request message may include a deletion request message, managing the security subdomain may include deleting the security subdomain, the deletion request message may include an identifier of the security subdomain, and when the first service ends, the security subdomain may be deleted according to the identifier of the security subdomain. Therefore, a security domain that may be used to store the configuration information of the first service can be managed according to a service status of a user-subscribed service.

Figure 23:
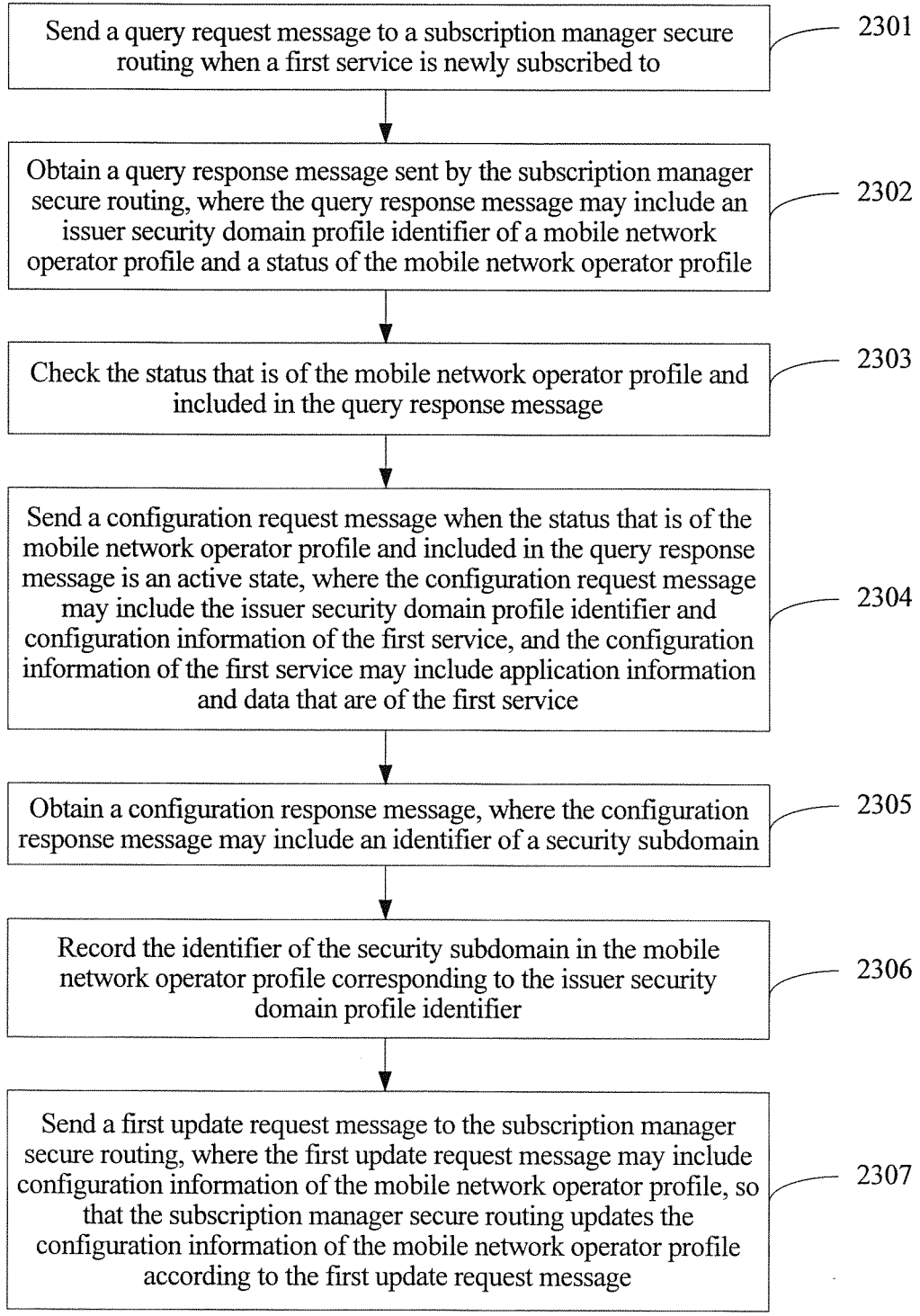
FIG. 23 is a schematic flowchart of a security domain management method according to yet another embodiment of the present invention.
Figure 24:
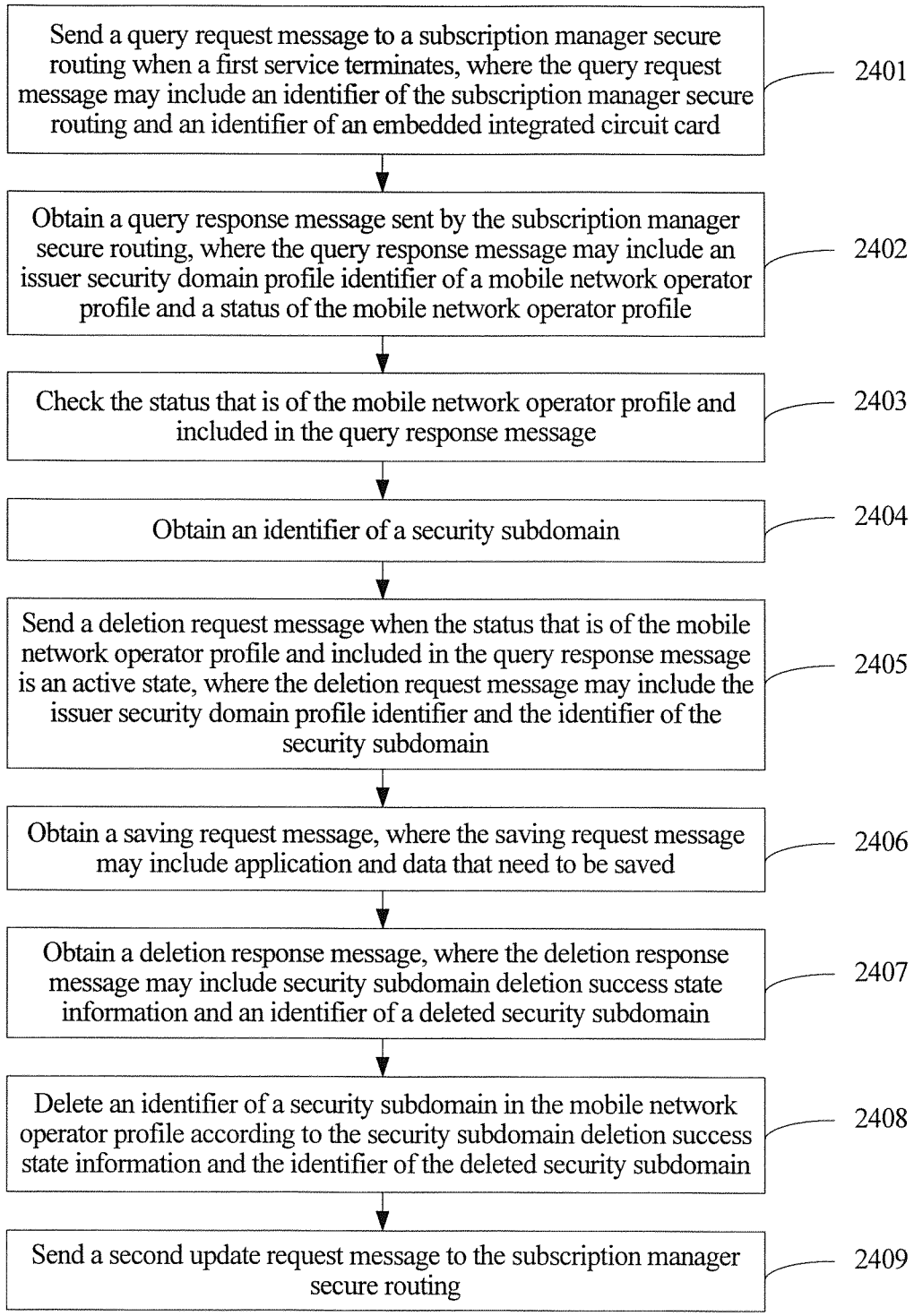
FIG. 24 is a schematic flowchart of another security domain management method according to yet another embodiment of the present invention.

On a basis of the embodiment shown in FIG. 20, an embodiment of the present invention provides a security domain management method, which may be applied to the communications field, and may be applied to a server in the security domain management system shown in FIG. 1. A mobile network operator profile may be preconfigured on the server. Referring to FIG. 23 and FIG. 24, the method may include the following steps:

Optionally, referring to FIG. 23, the management request message may include a configuration request message, and the managing a security subdomain may include creating the security subdomain.

2301. Send a query request message to a subscription manager secure routing when the first service is newly subscribed to.

The query request message may include an identifier of the subscription manager secure routing and an identifier of an embedded integrated circuit card.

2302. Obtain a query response message sent by the subscription manager secure routing, where the query response message may include an issuer security domain profile identifier of the mobile network operator profile and a status of the mobile network operator profile.

2303. Check the status that is of the mobile network operator profile and included in the query response message.

2304. Send the configuration request message when the status that is of the mobile network operator profile and included in the query response message is an active state, where the configuration request message may include the issuer security domain profile identifier and configuration information of the first service, and the configuration information of the first service may include application information and data that are of the first service.

Specifically, a configuration request message may be sent to the communications terminal, so that the communications terminal manages the security subdomain according to the management request message.

This step is one of specific implementation manners of the following content: sending a management request message when the status that is of the mobile network operator profile and included in the query response message is an active state, where the configuration request message may include the issuer security domain profile identifier, and the security subdomain may be used to store configuration information of a first service.

2305. Obtain a configuration response message, where the configuration response message may include an identifier of the security subdomain.

Specifically, a configuration response message sent by the communications terminal may be obtained.

2306. Record the identifier of the security subdomain in the mobile network operator profile corresponding to the issuer security domain profile identifier.

2307. Send a first update request message to the subscription manager secure routing, where the first update request message may include configuration information of the mobile network operator profile, so that the subscription manager secure routing updates the configuration information of the mobile network operator profile according to the first update request message.

In this way, mobile network operator profiles in the subscription manager secure routing, the server, and the communications terminal can be synchronized, where the configuration information of the mobile network operator profile may include type, version, and security subdomain information of the mobile network operator profile.

Optionally, referring to FIG. 24, the management request message may include a deletion request message, and the managing a security subdomain may include deleting the security subdomain.

2401. Send a query request message to a subscription manager secure routing when the first service ends, where the query request message may include an identifier of the subscription manager secure routing and an identifier of an embedded integrated circuit card.

2402. Obtain a query response message sent by the subscription manager secure routing, where the query response message may include an issuer security domain profile identifier of the mobile network operator profile and a status of the mobile network operator profile.

2403. Check the status that is of the mobile network operator profile and included in the query response message.

2404. Obtain an identifier of the security subdomain.

Specifically, the server may obtain the identifier of the security subdomain from data locally stored on the server or from a third party. For example, the server first obtains an identifier of a known security subdomain from the communications terminal, and then selects, from the identifier, an identifier that needs to be deleted.

2405. Send the deletion request message when the status that is of the mobile network operator profile and included in the query response message is an active state, where the deletion request message may include the issuer security domain profile identifier and the identifier of the security subdomain.

Specifically, a deletion request message may be sent to the communications terminal, so that the communications terminal manages the security subdomain according to the management request message.

This step is one of specific implementation manners of the following content: The server sends a management request message to the communications terminal when the status that is of the mobile network operator profile and included in the query response message is an active state, where the configuration request message may include the issuer security domain profile identifier, and the security subdomain may be used to store configuration information of a first service.

2406. Obtain a saving request message, where the saving request message may include application and data that need to be saved.

Specifically, a saving request message sent by the communications terminal may be obtained.

Optionally, after step 2406 is performed, the application and the data that need to be saved may be saved according to the saving request message.

2407. Obtain a deletion response message, where the deletion response message may include security subdomain deletion success state information and the identifier of the deleted security subdomain.

Specifically, a deletion response message sent by the communications terminal may be obtained.

2408. Delete an identifier of a security subdomain in the mobile network operator profile according to the security subdomain deletion success state information and the identifier of the deleted security subdomain.

After the identifier of the security subdomain in the mobile network operator profile is deleted, the following step is performed.

2409. Send a second update request message to the subscription manager secure routing.

The second update request message may include configuration information of the mobile network operator profile in which the identifier of the security subdomain is deleted, so that the subscription manager secure routing updates the configuration information of the mobile network operator profile according to the second update request message, which can synchronize mobile network operator profiles in the subscription manager secure routing, the server, and the communications terminal.

Optionally, for the foregoing steps of this embodiment, before a management response message is obtained, the method may further include the following steps:

B1. Send an activation request message if the status that is of the mobile network operator profile and included in the query response message is an inactive state.

Specifically, an activation request message may be sent to the communications terminal.

B2. Obtain an activation response message, where the activation response message may include a status of the mobile network operator profile.

Specifically, an activation response message sent by the communications terminal may be obtained.

B3. Check the status that is of the mobile network operator profile and included in the activation response message.

B4. Send the deletion request message when the status that is of the mobile network operator profile and included in the activation response message is an active state.

Specifically, a deletion request message may be sent to the communications terminal.

According to the server provided in this embodiment of the present invention, the server can send a management request message to a communications terminal, where the management request message may include the issuer security domain profile identifier, and then manage a security subdomain in a mobile network operator profile corresponding to the issuer security domain profile identifier. The management request message may include a configuration request message, managing the security subdomain may include creating the security subdomain, the configuration request message may further include configuration information of a first service, and when the first service is being newly subscribed to, the configuration information of the first service may be stored in the security subdomain; or the management request message may include a deletion request message, managing the security subdomain may include deleting the security subdomain, the deletion request message may include an identifier of the security subdomain, and when the first service ends, the security subdomain may be deleted according to the identifier of the security subdomain. Therefore, a security domain that may be used to store the configuration information of the first service can be managed according to a service status of a user-subscribed service.

Figure 25:
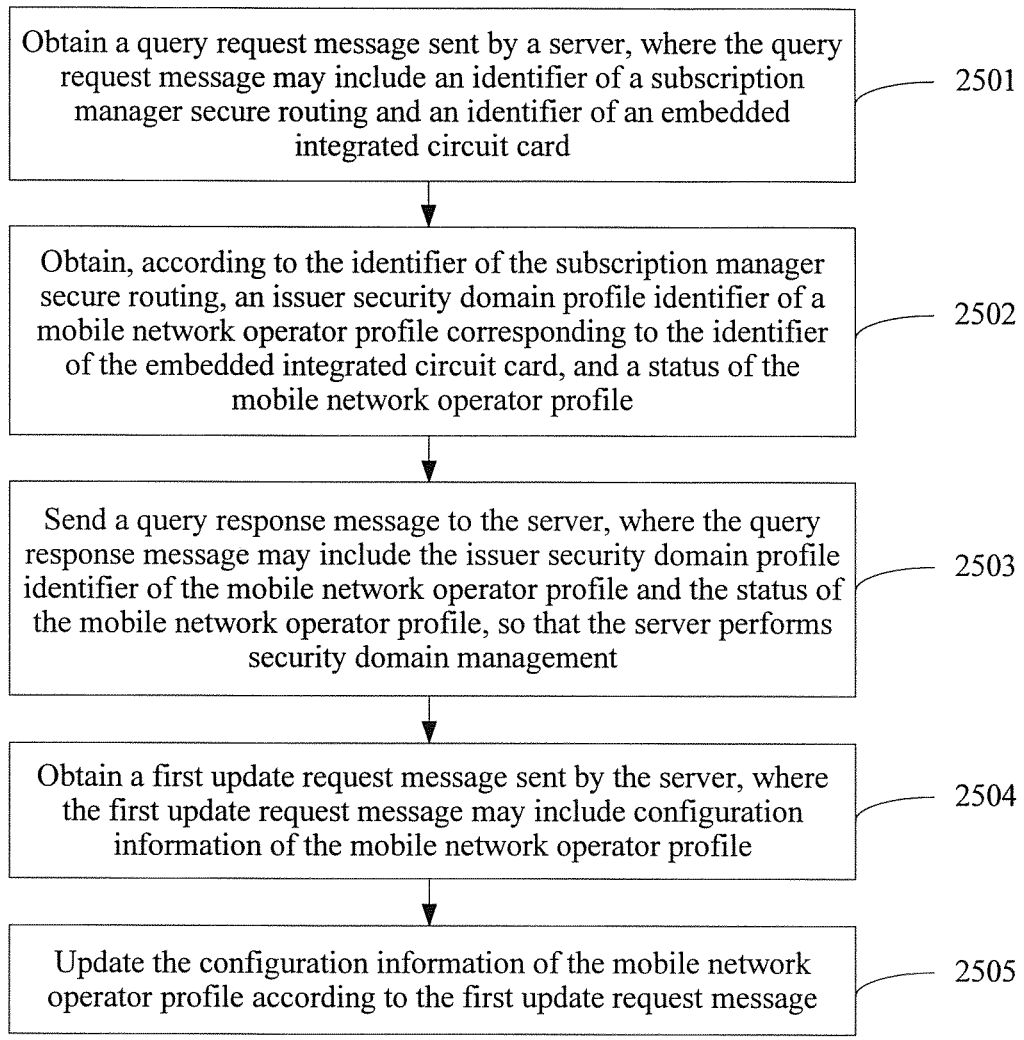
FIG. 25 is a schematic flowchart of a security domain management method according to an embodiment of the present invention.

An embodiment of the present invention provides a security domain management method, which may be applied to the communications field, and may be applied to a subscription manager secure routing in the security domain management system shown in FIG. 1. Referring to FIG. 25, the method may include the following steps:

2501. Obtain a query request message sent by a server, where the query request message may include an identifier of the subscription manager secure routing and an identifier of an embedded integrated circuit card.

2502. Obtain, according to the identifier of the subscription manager secure routing, an issuer security domain profile identifier of the mobile network operator profile corresponding to the identifier of the embedded integrated circuit card, and a status of the mobile network operator profile.

2503. Send a query response message to the server, where the query response message may include the issuer security domain profile identifier of the mobile network operator profile and the status of the mobile network operator profile, so that the server performs security domain management.

Optionally, after step 2503 is performed, the security domain management method may further include the following steps:

2504. Obtain a first update request message sent by the server, where the first update request message may include configuration information of the mobile network operator profile.

2505. Update the configuration information of the mobile network operator profile according to the first update request message.

In this way, mobile network operator profiles in the subscription manager secure routing, the server, and the communications terminal can be synchronized, where the configuration information of the mobile network operator profile may include type, version, and security subdomain information of the mobile network operator profile.

According to the security domain management method provided in this embodiment of the present invention, a subscription manager secure routing obtains a query request message sent by a server; obtains an issuer security domain profile identifier of a mobile network operator profile and a status of the mobile network operator profile according to the query request message; and sends a query response message to the server, where the query response message may include the issuer security domain profile identifier of the mobile network operator profile and the status of the mobile network operator profile, so that the server performs security domain management.

Figure 26:
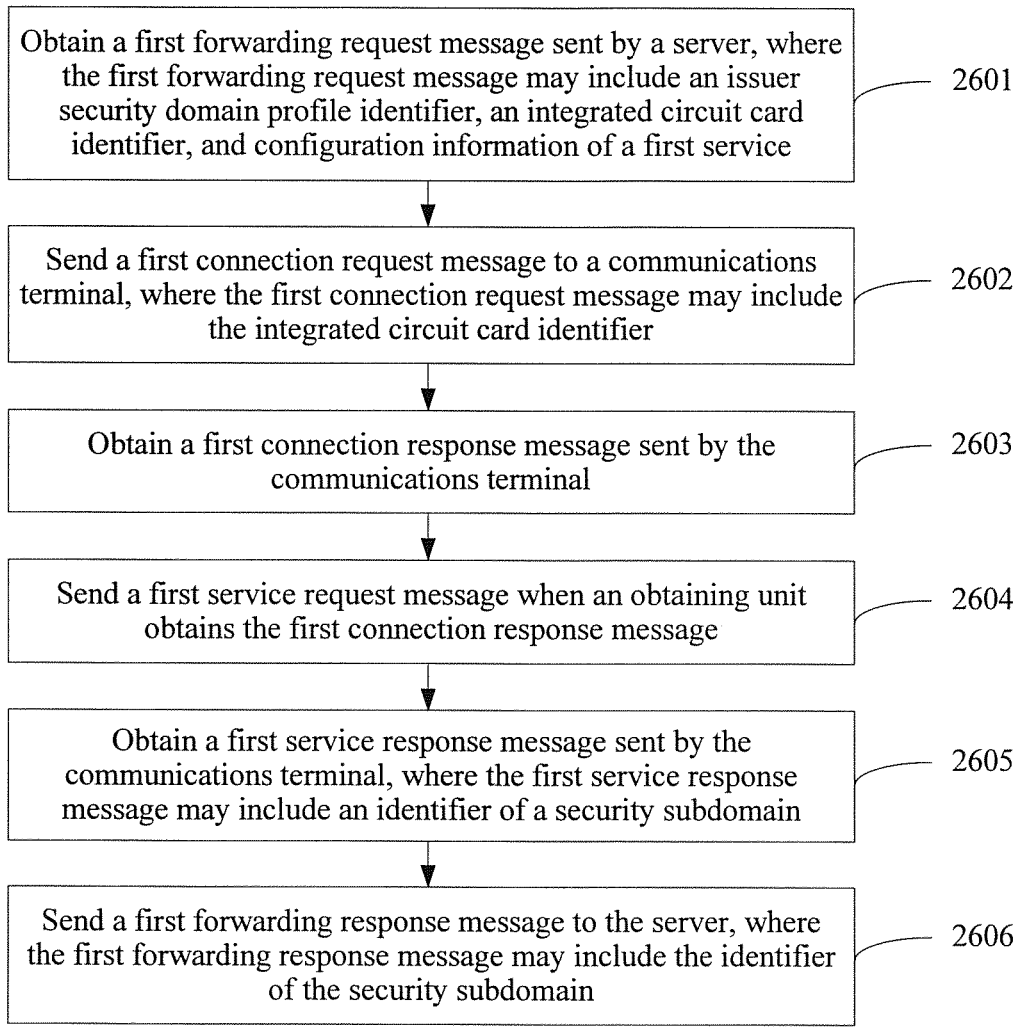
FIG. 26 is a schematic flowchart of a security domain management method according to an embodiment of the present invention.

An embodiment of the present invention provides a security domain management method, which may be applied to the communications field, and may be applied to a trusted service manager in the security domain management system shown in FIG. 1. Referring to FIG. 26, the method may include the following steps:

2601. Obtain a first forwarding request message sent by a server, where the first forwarding request message may include the issuer security domain profile identifier, an integrated circuit card identifier, and configuration information of the first service.

The configuration information of the first service may include application information and data that are of the first service.

2602. Send a first connection request message to a communications terminal, where the first connection request message may include the integrated circuit card identifier.

2603. Obtain a first connection response message sent by the communications terminal.

2604. Send a first service request message when the obtaining unit obtains the first connection response message.

The first service request message may include an issuer security domain profile identifier of the mobile network operator profile and the configuration information of the first service, and the configuration information of the first service may include the application and the data that are of the first service, so that the communications terminal configures a security domain for the first service.

2605. Obtain a first service response message sent by the communications terminal, where the first service response message may include an identifier of a security subdomain.

2606. Send a first forwarding response message to the server, where the first forwarding response message may include the identifier of the security subdomain.

According to the security domain management method provided in this embodiment of the present invention, a trusted service manager forwards a message of communication between a server and a communications terminal, and assists the server and the communications terminal in managing, in a mobile network operator profile, a security domain that may be used to store configuration information of a first service.

Figure 27:
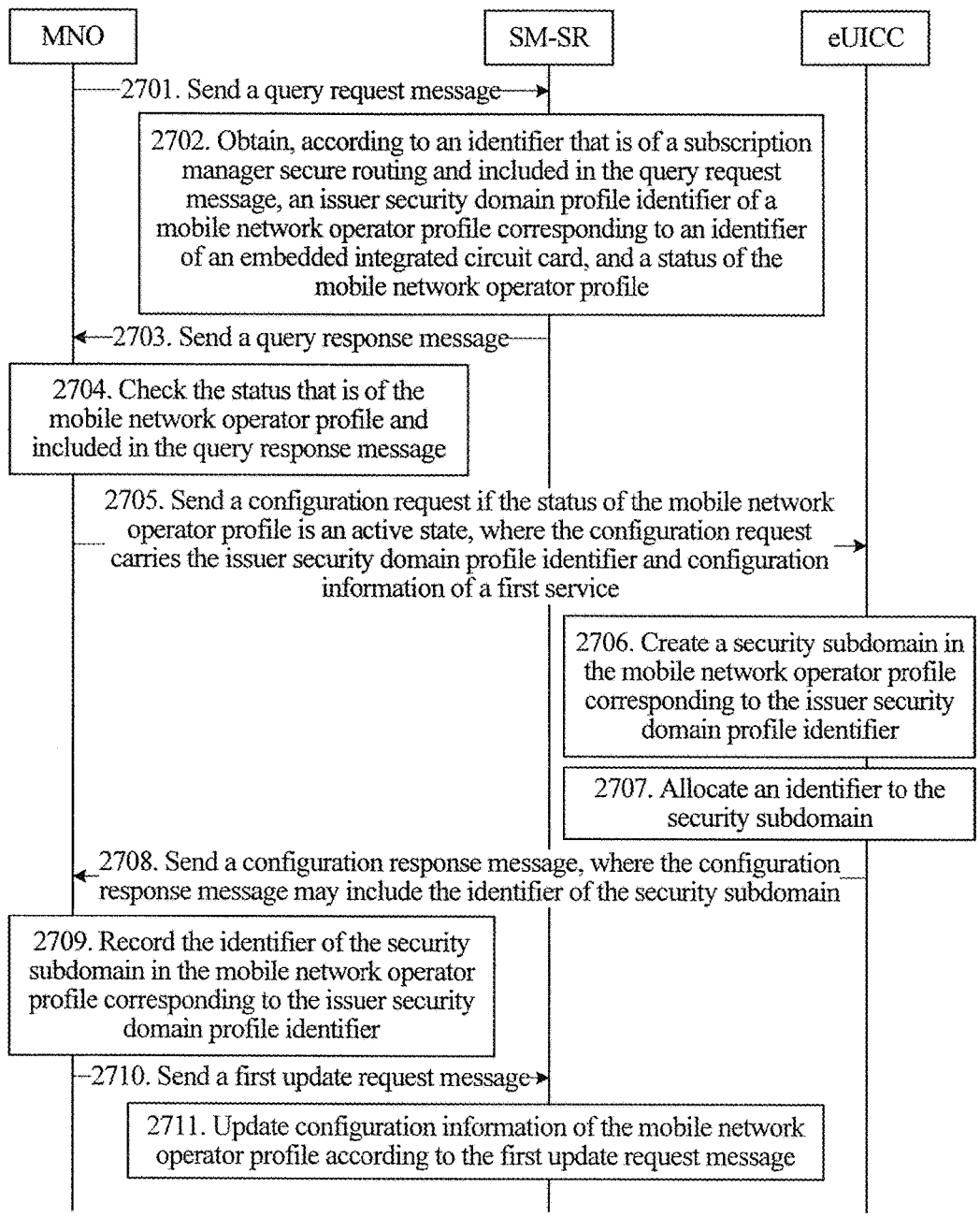
FIG. 27 is a schematic diagram of data interaction in a security domain management method according to an embodiment of the present invention.

On a basis of the foregoing embodiments, an embodiment of the present invention provides a security domain management method, which may be applied to the communications field, and may be applied to the security domain management system shown in FIG. 1. Specifically, the method may be applied together with the devices provided in the foregoing embodiments, and may be applied to a scenario in which a security domain that may be used to store configuration information of a first service is added to a mobile network operator profile of a communications terminal when a user newly subscribes to the first service. The first service may include a mobile payment service. Referring to FIG. 27, in some steps of this embodiment, reference further needs to be made to FIG. 28, FIG. 29, or FIG. 30A and FIG. 30B, and specific steps are as follows:

2701. A server sends a query request message to a subscription manager secure routing when a first service is being newly subscribed to, where the query request message may include an identifier of the subscription manager secure routing and an identifier of an embedded integrated circuit card.

After obtaining the query request message sent by the server, the subscription manager secure routing performs the following steps:

2702. The subscription manager secure routing obtains, according to the identifier that is of the subscription manager secure routing and included in the query request message, an issuer security domain profile identifier of the mobile network operator profile corresponding to the identifier of the embedded integrated circuit card, and a status of the mobile network operator profile.

2703. The subscription manager secure routing sends a query response message to the server, where the query response message may include the issuer security domain profile identifier of the mobile network operator profile and the status of the mobile network operator profile.

Such is performed so that the server performs security domain management.

After obtaining the query response message sent by the subscription manager secure routing, the server performs the following steps:

2704. The server checks the status that is of the mobile network operator profile and included in the query response message.

2705. The server sends a configuration request message to the communications terminal if the status that is of the mobile network operator profile and included in the query response message is an active state, where the configuration request message may include the issuer security domain profile identifier and configuration information of the first service.

The configuration information of the first service may include application information and data that are of the first service.

After obtaining the configuration request message sent by the server, the communications terminal performs the following steps:

2706. The communications terminal creates a security subdomain in the mobile network operator profile corresponding to the issuer security domain profile identifier.

The security subdomain may be used to store the configuration information of the first service.

2707. The communications terminal allocates an identifier to the security subdomain.

2708. The communications terminal sends a configuration response message to the server, where the configuration response message may include the identifier of the security subdomain.

After obtaining the configuration response message sent by the communications terminal, the server performs the following steps:

2709. The server records the identifier of the security subdomain in the mobile network operator profile corresponding to the issuer security domain profile identifier.

2710. The server sends a first update request message to the subscription manager secure routing, where the first update request message may include configuration information of the mobile network operator profile.

Such is performed so that the subscription manager secure routing updates the configuration information of the mobile network operator profile according to the first update request message, so as to synchronize mobile network operator profiles in the subscription manager secure routing, the server, and the communications terminal, where the configuration information of the mobile network operator profile may include type, version, and security subdomain information of the mobile network operator profile.

Optionally, after obtaining the first update request message sent by the server, the subscription manager secure routing performs the following step:

2711. The subscription manager secure routing updates the configuration information of the mobile network operator profile according to the first update request message.

Therefore, the mobile network operator profiles in the subscription manager secure routing, the server, and the communications terminal are synchronized.

Optionally, if the status that is of the mobile network operator profile and included in the query response message is an inactive state, step 2705 is not performed, and is replaced by the following step 2705*a* to step 2705*f*:

2705a. The server sends an activation request message to the communications terminal if the status that is of the mobile network operator profile and included in the query response message is an inactive state.

After obtaining the activation request message sent by the server, the communications terminal performs the following steps:

2705b. The communications terminal obtains a user instruction according to the activation request message.

2705c. The communications terminal changes the status of the mobile network operator profile to an active state when the user instruction is an activation instruction.

2705d. The communications terminal sends the activation response message to the server, where the activation response message may include a status of the mobile network operator profile.

After obtaining the activation response message sent by the communications terminal, the server performs the following steps:

2705e. The server checks the status that is of the mobile network operator profile and included in the activation response message.

2705f. The server sends a configuration request message to the communications terminal when the status that is of the mobile network operator profile and included in the activation response message is an active state.

Figure 28:
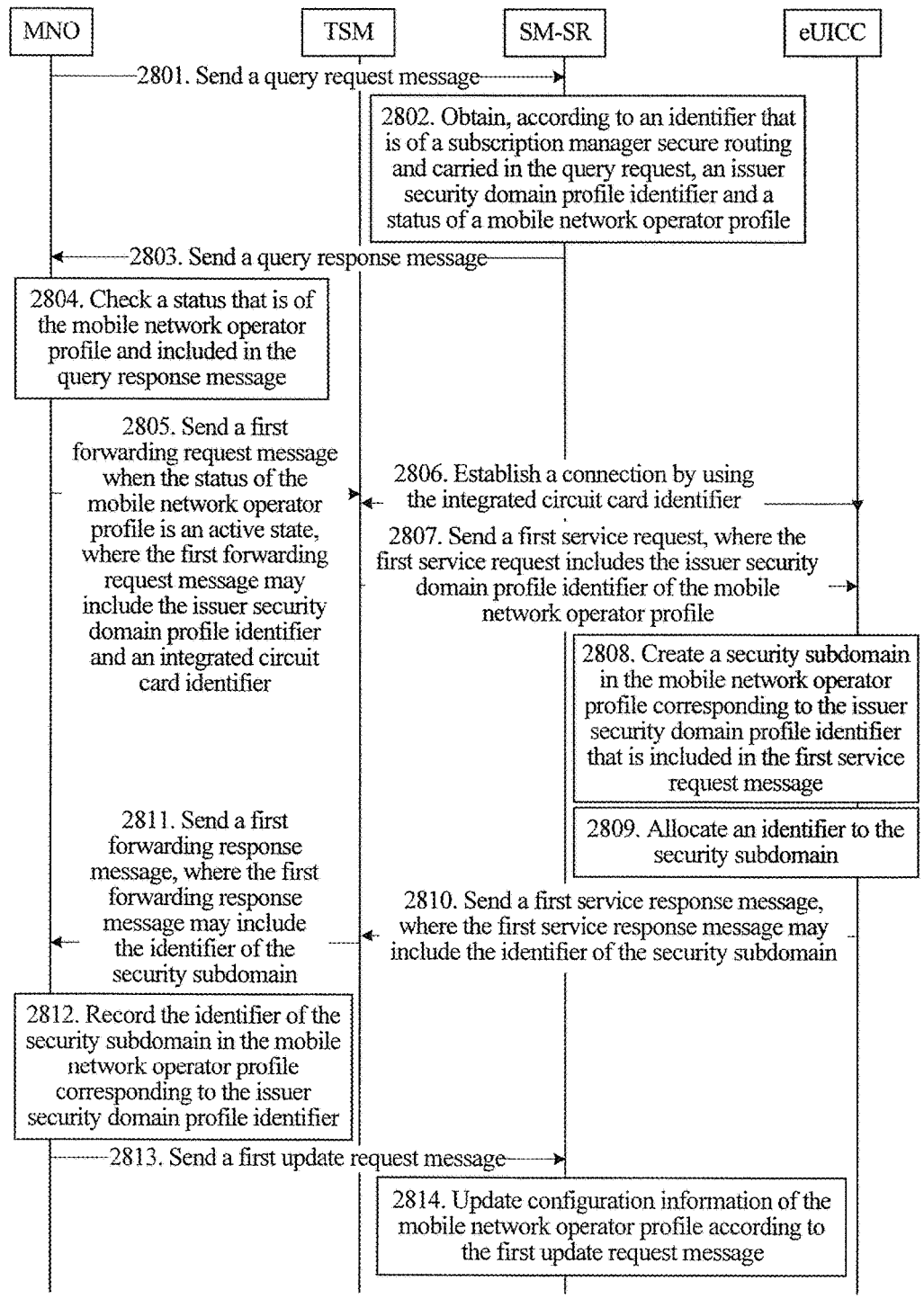
FIG. 28 is a schematic diagram of data interaction in another security domain management method according to an embodiment of the present invention.

Further, referring to FIG. 28, optionally, when the security domain management system may include a trusted service manager, steps are as follows:

2801. A server sends a query request message to a subscription manager secure routing, where the query request message may include an identifier of the subscription manager secure routing and an identifier of an embedded integrated circuit card.

After obtaining the query request message sent by the server, the subscription manager secure routing performs the following steps:

2802. The subscription manager secure routing obtains, according to the identifier that is of the subscription manager secure routing and carried in the query request, an issuer security domain profile identifier of the mobile network operator profile corresponding to the identifier of the embedded integrated circuit card, and a status of the mobile network operator profile.

2803. The subscription manager secure routing sends a query response message to the server, where the query response message may include the issuer security domain profile identifier of the mobile network operator profile and the status of the mobile network operator profile.

Such is performed so that the server performs security domain management.

After obtaining the query response message sent by the subscription manager secure routing, the server performs the following steps:

2804. The server checks the status that is of the mobile network operator profile and included in the query response message.

2805. The server sends a first forwarding request message to the trusted service manager when the status that is of the mobile network operator profile and included in the query response message is an active state, where the first forwarding request message may include the issuer security domain profile identifier, an integrated circuit card identifier, and configuration information of the first service.

The configuration information of the first service may include application information and data that are of the first service.

After the trusted service manager obtains the first forwarding request message sent by the server, the following step is performed:

2806. Establish a connection between the trusted service manager and the communications terminal by using the integrated circuit card identifier.

Specifically, optionally, the trusted service manager sends a first connection request message to the communications terminal, where the first connection request message may include the integrated circuit card identifier.

After the communications terminal obtains the first connection request message sent by the trusted service manager, the communications terminal sends a first connection response message when the integrated circuit card identifier that may be included in the first connection request message matches the communications terminal itself.

After the trusted service manager obtains the first connection response message sent by the communications terminal, that is, after the connection is established between the trusted service manager and the communications terminal, the following step is performed:

2807. The trusted service manager sends a first service request message to the embedded integrated circuit card, where the first service request message may include the issuer security domain profile identifier of the mobile network operator profile and the configuration information of the first service.

After obtaining the first service request message sent by the trusted service manager, the communications terminal performs the following steps:

2808. The communications terminal creates a security subdomain in the mobile network operator profile corresponding to the issuer security domain profile identifier that is included in the first service request message.

The security subdomain may be used to store the configuration information of the first service.

2809. The communications terminal allocates an identifier to the security subdomain.

2810. The communications terminal sends a first service response message to the trusted service manager, where the first service response message may include the identifier of the security subdomain.

After obtaining the first service response message sent by the communications terminal, the trusted service manager performs the following step:

2811. The trusted service manager sends a first forwarding response message to the server, where the first forwarding response message may include the identifier of the security subdomain.

After obtaining the first forwarding response message sent by the trusted service manager, the server performs the following steps:

2812. The server records the identifier of the security subdomain in the mobile network operator profile corresponding to the issuer security domain profile identifier.

2813. The server sends a first update request message to the subscription manager secure routing, where the first update request message may include configuration information of the mobile network operator profile.

Such is performed so that the subscription manager secure routing updates the configuration information of the mobile network operator profile according to the first update request message, so as to synchronize mobile network operator profiles in the subscription manager secure routing, the server, and the communications terminal, where the configuration information of the mobile network operator profile may include type, version, and security subdomain information of the mobile network operator profile.

Optionally, after obtaining the first update request message sent by the server, the subscription manager secure routing performs the following step:

2814. The subscription manager secure routing updates the configuration information of the mobile network operator profile according to the first update request message.

Therefore, the mobile network operator profiles in the subscription manager secure routing, the server, and the communications terminal are synchronized.

Optionally, when the status that is of the mobile network operator profile and included in the query response message is an inactive state, step 2805 may also be replaced by step 2705a to step 2705f, but in this case, it should be noted herein that content of step 2705f needs to be changed to:

The server sends a first forwarding request message to the trusted service manager when the status that is of the mobile network operator profile and included in the activation response message is an active state, where the first forwarding request message may include the issuer security domain profile identifier, an integrated circuit card identifier, and configuration information of the first service.

Figure 29:
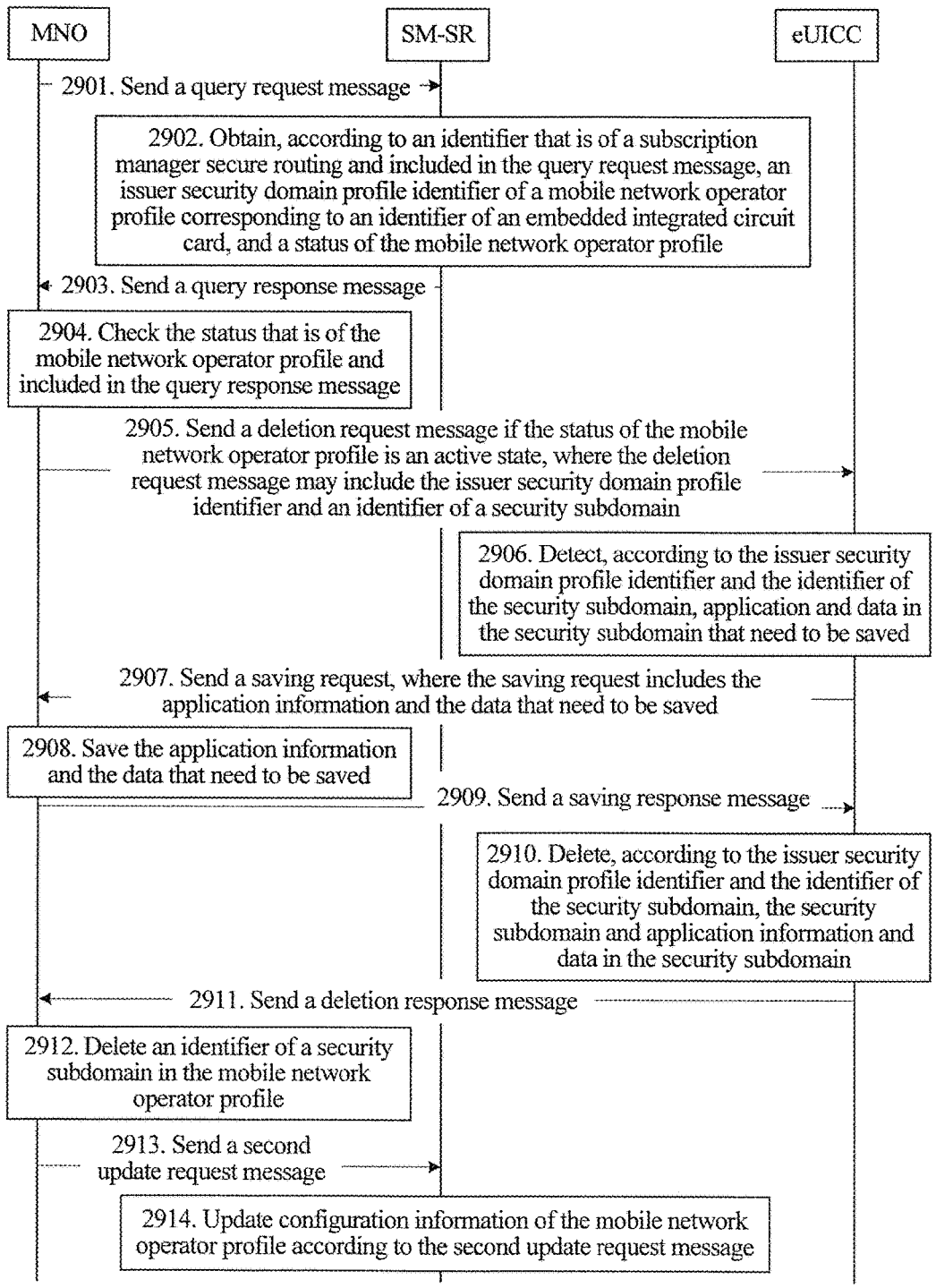
FIG. 29 is a schematic diagram of data interaction in still another security domain management method according to an embodiment of the present invention.

Optionally, on a basis of the foregoing steps of this embodiment, when the first service ends, referring to FIG. 29, the security domain management method may further include the following steps:

2901. The server sends a query request message to the subscription manager secure routing when the first service ends, where the query request message may include an identifier of the subscription manager secure routing and an identifier of the embedded integrated circuit card.

After obtaining the query request message sent by the server, the subscription manager secure routing performs the following steps:

2902. The subscription manager secure routing obtains, according to the identifier that is of the subscription manager secure routing and included in the query request message, an issuer security domain profile identifier of the mobile network operator profile corresponding to the identifier of the embedded integrated circuit card, and a status of the mobile network operator profile.

2903. The subscription manager secure routing sends a query response message to the server, where the query response message may include the issuer security domain profile identifier and the status of the mobile network operator profile.

After obtaining the query response message sent by the subscription manager secure routing, the server performs the following steps:

2904. The server checks the status that is of the mobile network operator profile and included in the query response message.

2905. The server sends a deletion request message to the communications terminal if the status that is of the mobile network operator profile and included in the query response message is an active state, where the deletion request message may include the issuer security domain profile identifier and an identifier of the security subdomain.

After obtaining the deletion request message sent by the server, the communications terminal performs the following steps:

2906. The communications terminal detects, according to the issuer security domain profile identifier and the identifier of the security subdomain, application and data in the security subdomain that need to be saved.

A detection standard of detecting the application and the data in the security subdomain that need to be saved may be preset with reference to service content of different services in practical application; or a standard of detecting the application and the data that need to be saved may be determined with reference to a user input instruction in practical application. In the present invention, specific content of the application and the data that need to be saved is not limited, and a specific method for detecting the application and the data in the security subdomain that need to be saved is also not limited provided that the application and the data that need to be saved can be detected.

2907. The communications terminal sends a saving request message to the server, where the saving request message may include the application and the data that need to be saved.

After obtaining the saving request message sent by the communications terminal, the server performs the following steps:

2908. The server saves the application and the data that need to be saved.

2909. The server sends a saving response message to the communications terminal after saving the application and the data that need to be saved.

After obtaining the saving response message sent by the server, the communications terminal performs the following steps:

2910. The communications terminal deletes, according to the issuer security domain profile identifier and the identifier of the security subdomain, the security subdomain in the mobile network operator profile corresponding to the issuer security domain profile identifier, and the application and the data in the security subdomain.

2911. The communications terminal sends a deletion response message to the server after deleting the security subdomain, where the deletion response message may include security subdomain deletion success state information and the identifier of the security subdomain.

After obtaining the deletion response message sent by the communications terminal, the server performs the following step:

2912. The server deletes, according to the security subdomain deletion success state information and the identifier of the deleted security subdomain, an identifier of a security subdomain in the mobile network operator profile.

Optionally, the method may further include:

2913. The server sends a second update request message to the subscription manager secure routing after deleting the identifier of the security subdomain in the mobile network operator profile, where the second update request message may include configuration information of the mobile network operator profile in which the identifier of the security subdomain is deleted.

Such is performed so that the subscription manager secure routing updates the configuration information of the mobile network operator profile according to the second update request message, so as to synchronize mobile network operator profiles in the subscription manager secure routing, the server, and the communications terminal.

After obtaining the second update request message sent by the server, the subscription manager secure routing performs the following step:

2914. The subscription manager secure routing updates the configuration information of the mobile network operator profile according to the second update request message.

Therefore, the mobile network operator profiles in the subscription manager secure routing, the server, and the communications terminal are synchronized.

Further, optionally, if the status that is of the mobile network operator profile and included in the query response message is an inactive state, step 2905 may be replaced by the following step 2905*a* to step 2905*f*:

2905*a*. The server sends an activation request message to the communications terminal.

After obtaining the activation request message sent by the server, the communications terminal performs the following steps:

2905*b*. The communications terminal obtains a user instruction according to the activation request message.

2905*c*. The communications terminal changes the status of the mobile network operator profile to an active state when the user instruction is an activation instruction.

2905*d*. The communications terminal sends the activation response message to the server, where the activation response message may include a status of the mobile network operator profile.

After obtaining the activation response message sent by the communications terminal, the server performs the following steps:

2905*e*. The server checks the status that is of the mobile network operator profile and included in the activation response message.

2905*f*. The server sends a deletion request message to the communications terminal when the status that is of the mobile network operator profile and included in the activation response message is an active state.

Figure 30A:
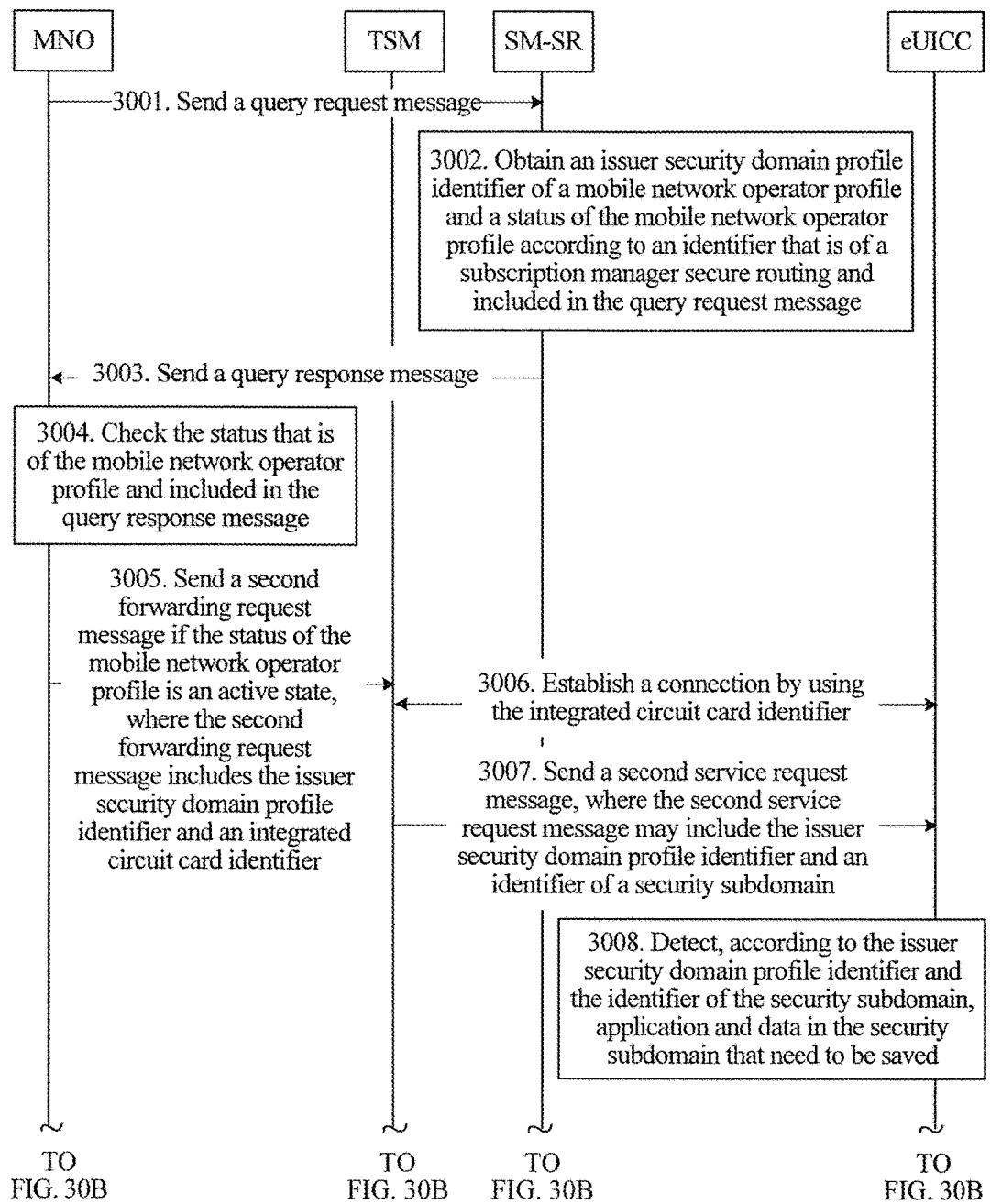
FIG. 30A and FIG. 30B are a schematic diagram of data interaction in yet another security domain management method according to an embodiment of the present invention.
Figure 30B:
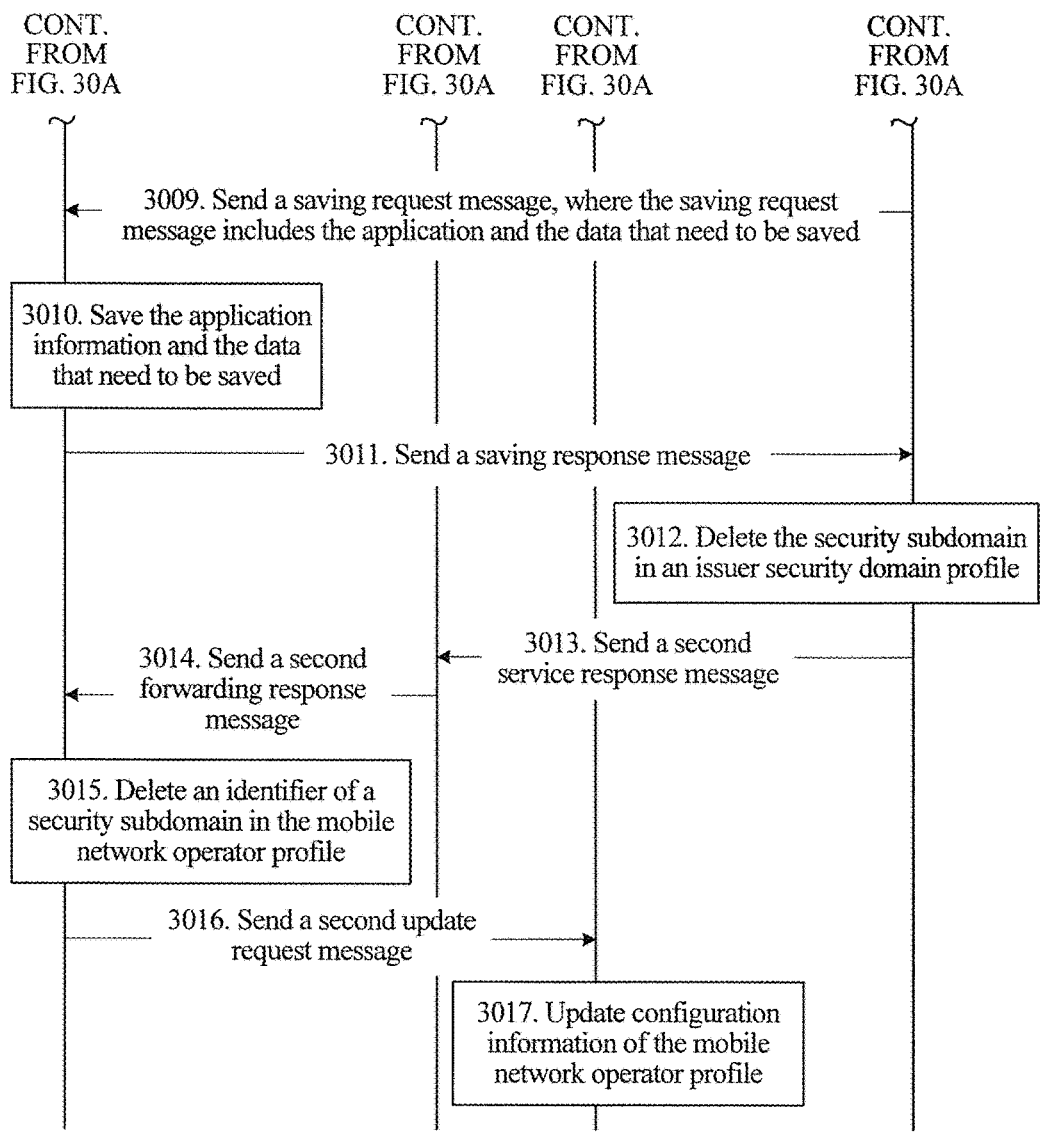

Further, referring to FIG. 30A and FIG. 30B, optionally, on a basis of the foregoing steps of this embodiment, when the security domain management system may include a trusted service manager, this embodiment may also be implemented by the following steps:

3001. The server sends a query request message to the subscription manager secure routing, where the query request message may include an identifier of the subscription manager secure routing and an identifier of the embedded integrated circuit card.

After obtaining the query request message sent by the server, the subscription manager secure routing performs the following steps:

3002. The subscription manager secure routing obtains, according to the identifier that is of the subscription manager secure routing and included in the query request message, an issuer security domain profile identifier of the mobile network operator profile corresponding to the identifier of the embedded integrated circuit card, and a status of the mobile network operator profile.

3003. The subscription manager secure routing sends a query response message to the server, where the query response message may include the issuer security domain profile identifier and the status of the mobile network operator profile.

After obtaining the query response message sent by the subscription manager secure routing, the server performs the following steps:

3004. The server checks the status that is of the mobile network operator profile and included in the query response message.

3005. Send a second forwarding request message to the trusted service manager if the status that is of the mobile network operator profile and included in the query response message is an active state, where the second forwarding request message may include the issuer security domain profile identifier, an integrated circuit card identifier, and an identifier of the security subdomain.

After the trusted service manager obtains the second forwarding request message sent by the server, the following step is performed:

3006. Establish a connection between the trusted service manager and the communications terminal by using the integrated circuit card identifier.

Specifically, optionally, the trusted service manager sends a second connection request message to the communications terminal, where the second connection request message may include the integrated circuit card identifier.

After the communications terminal obtains the second connection request message sent by the trusted service manager, the communications terminal sends a second connection response message when the integrated circuit card identifier that may be included in the second connection request message matches the communications terminal itself.

After the trusted service manager obtains the second connection response message sent by the communications terminal, that is, after the connection is established between the trusted service manager and the communications terminal, the following step is performed:

3007. The trusted service manager sends a second service request message to the communications terminal, where the second service request message may include the issuer security domain profile identifier and the identifier of the security subdomain.

After obtaining the second service request message sent by the trusted service manager, the communications terminal performs the following steps:

3008. The communications terminal detects, according to the issuer security domain profile identifier and the identifier of the security subdomain, application and data in the security subdomain that need to be saved.

3009. The communications terminal sends a saving request message to the server, where the saving request message may include the application and the data that need to be saved.

After obtaining the saving request message sent by the communications terminal, the server performs the following steps:

3010. The server saves the application and the data that need to be saved.

3011. The server sends a saving response message to the communications terminal after saving the application and the data that need to be saved.

After obtaining the saving response message sent by the server, the communications terminal performs the following steps:

3012. The communications terminal deletes, according to the issuer security domain profile identifier and the identifier of the security subdomain that are included in the second service request message, the security subdomain in the mobile network operator profile corresponding to the issuer security domain profile identifier.

Specifically, after the communications terminal obtains the saving response message, the communications terminal deletes, according to the issuer security domain profile identifier and the identifier of the security subdomain, the security subdomain in the mobile network operator profile corresponding to the issuer security domain profile identifier, and the application and the data in the security subdomain.

3013. The communications terminal sends a second service response message to the trusted service manager after deleting the security subdomain, where the second service response message may include security subdomain deletion success state information and the identifier of the deleted security subdomain.

After obtaining the second service response message sent by the communications terminal, the trusted service manager performs the following step:

3014. The trusted service manager sends a second forwarding response message to the server, where the second forwarding response message may include the security subdomain deletion success state information and the identifier of the deleted security subdomain.

After obtaining the second forwarding response message sent by the trusted service manager, the server performs the following step:

3015. The server deletes, according to the obtained security subdomain deletion success state information and the obtained identifier of the deleted security subdomain, an identifier of a security subdomain in the mobile network operator profile.

Optionally, the method may further include:

3016. The server sends a second update request message to the subscription manager secure routing after deleting the identifier of the security subdomain in the mobile network operator profile, where the second update request message may include configuration information of the mobile network operator profile in which the identifier of the security subdomain is deleted.

Such is performed so that the subscription manager secure routing updates the configuration information of the mobile network operator profile according to the second update request message, so as to synchronize mobile network operator profiles in the subscription manager secure routing, the server, and the communications terminal.

After obtaining the second update request message sent by the server, the subscription manager secure routing performs the following step:

3017. The subscription manager secure routing updates the configuration information of the mobile network operator profile according to the second update request message.

Therefore, the mobile network operator profiles in the subscription manager secure routing, the server, and the communications terminal are synchronized.

Optionally, when the status that is of the mobile network operator profile and included in the query response message is an inactive state, step 3005 may also be replaced by step 2905a to step 2905f, but in this case, it should be noted herein that content of step 2905f needs to be changed to:

The server sends a second forwarding request message to the trusted service manager when the status that is of the mobile network operator profile and included in the activation response message is an active state, where the second forwarding request message may include the issuer security domain profile identifier, an integrated circuit card identifier, and an identifier of the security subdomain.

According to the communications terminal provided in this embodiment of the present invention, the communications terminal can obtain a management request message sent by a server, where the management request message may include the issuer security domain profile identifier; and then the communications terminal manages a security subdomain in a mobile network operator profile corresponding to the issuer security domain profile identifier. The management request message may include a configuration request message, managing the security subdomain may include creating the security subdomain, the configuration request message may further include configuration information of a first service, and when the first service is being newly subscribed to, the communications terminal may store the configuration information of the first service in the security subdomain; or the management request message may include a deletion request message, managing the security subdomain may include deleting the security subdomain, the deletion request message may include an identifier of the security subdomain, and when the first service ends, the communications terminal may delete the security subdomain according to the identifier of the security subdomain. Therefore, a security domain that may be used to store the configuration information of the first service can be managed according to a service status of a user-subscribed service.

In addition, it can be learned from the security domain management method provided in this embodiment of the present invention that, a configured security domain may further be deleted by using a procedure similar to a procedure of configuring a security domain. Therefore, according to the security domain management method provided in this embodiment of the present invention, configuration information and a security domain that are related to a newly subscribed service can be added to a mobile network operator profile of the communications terminal, and the related security domain and the related configuration information are deleted when the newly subscribed service ends, to manage the security domain that may be used to store the configuration information of the first service.

It can be learned from the foregoing descriptions that, according to the security domain management method provided in this embodiment of the present invention, a user does not need to change a universal integrated circuit card, and in a form of the communications terminal, the security domain can be flexibly managed according to whether the user is subscribed to a mobile service.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communications terminal, comprising:
a network interface, a processor, and a bus, wherein the network interface and the processor are interconnected by using the bus;
the network interface is configured to obtain a management request message comprising:
an issuer security domain profile identifier, and
a configuration request message;
the processor is configured to manage a security subdomain in a mobile network operator profile corresponding to the issuer security domain profile identifier, wherein the security subdomain is used to store configuration information of a first service;
the network interface is configured to obtain the configuration request message when the first service is being newly subscribed to, wherein the configuration request message comprises the issuer security domain profile identifier and the configuration information of the first service, and the configuration information of the first service comprises application and data of the first service; and the processor is configured to:
create the security subdomain in the mobile network operator profile corresponding to the issuer security domain profile identifier, and store the configuration information of the first service in the security subdomain,
allocate an identifier to the security subdomain created by the processor, and
manage the security subdomain according to the identifier of the security subdomain.

2. The communications terminal according to claim 1, wherein the network interface is further configured to send a configuration response message comprising the identifier that is of the security subdomain and allocated by the processor.

3. The communications terminal according to claim 1, wherein:
the management request message comprises a deletion request message;
the network interface is configured to obtain the deletion request message when the first service ends, wherein the deletion request message comprises the issuer security domain profile identifier and an identifier of the security subdomain; and
the processor is configured to delete, according to the issuer security domain profile identifier and the identifier of the security subdomain, the security subdomain in the mobile network operator profile corresponding to the issuer security domain profile identifier.

4. The communications terminal according to claim 3, wherein:
the processor is further configured to detect, according to the issuer security domain profile identifier and the identifier of the security subdomain that are comprised in the deletion request message obtained by the network interface, application and data in the security subdomain that need to be saved;
the network interface is further configured to send a saving request message, wherein the saving request message comprises the application and the data that need to be saved and that are detected by the processor; and
the processor is configured to:
after the network interface sends the saving request message, delete, according to the issuer security domain profile identifier and the identifier of the security subdomain that are obtained by the network interface, the security subdomain in the mobile network operator profile corresponding to the issuer security domain profile identifier, and the application and the data in the security subdomain.

5. The communications terminal according to claim 3, wherein the network interface is further configured to send a deletion response message after the processor deletes the security subdomain, wherein the deletion response message comprises security subdomain deletion success state information and the identifier of the security subdomain deleted by the processor.

6. The communications terminal according to claim 1, wherein:
the network interface is further configured to:
obtain an activation request message, and
obtain a user instruction according to the activation request message;
the processor is further configured to change a status of the mobile network operator profile to an active state when the user instruction obtained by the network interface is an activation instruction; and
the network interface is further configured to send the activation response message, wherein the activation response message comprises the status that is of the mobile network operator profile and changed by the processor.

7. A server, comprising:
a network interface, a processor, and a bus, wherein the network interface and the processor are interconnected by using the bus;
the network interface is configured to:
send a query request message to a subscription manager secure routing, wherein the query request message comprises an identifier of the subscription manager secure routing and an identifier of an embedded integrated circuit card, and
obtain a query response message sent by the subscription manager secure routing, wherein the query response message comprises an issuer security domain profile identifier of a mobile network operator profile and a status of the mobile network operator profile;
the processor is configured to check the status of the mobile network operator profile; and
the network interface is further configured to:
send a management request message when the status of the mobile network operator profile is an active state, to enable a communications terminal to manage a security subdomain corresponding to the management request message, wherein the management request message comprises a configuration request message, wherein the configuration request message comprises the issuer security domain profile identifier, and the security subdomain is configured to store configuration information of a first service, and
send the configuration request message when the first service is being newly subscribed to and the status of the mobile network operator profile is an active state, to enable the communications terminal to create the security subdomain according to the management request message, wherein the configuration request message comprises the issuer security domain profile identifier and the configuration information of the first service, and the configuration information of the first service comprises application information and data that are of the first service.

8. The server according to claim 7, wherein:
the network interface is further configured to obtain a configuration response message comprising an identifier of the security subdomain; and
the processor is further configured to record the identifier of the security subdomain.

9. The server according to claim 8, wherein the network interface is further configured to send a first update request message to the subscription manager secure routing after the processor records the identifier of the security subdomain in the mobile network operator profile corresponding to the issuer security domain profile identifier, wherein the first update request message comprises configuration information of the mobile network operator profile, to enable the subscription manager secure routing to update the configuration information of the mobile network operator profile according to the first update request message, wherein the configuration information of the mobile network operator profile comprises type, version, and security subdomain information of the mobile network operator profile.

10. The server according to claim 7, wherein:
the management request message comprises a deletion request message;
the network interface is further configured to:
  obtain an identifier of the security subdomain when the first service ends, and
  send the deletion request message when the status of the mobile network operator profile is an active state, to enable the communications terminal to delete the security subdomain according to the management request message, wherein the deletion request message comprises the issuer security domain profile identifier and the identifier of the security subdomain.

11. The server according to claim 10, wherein:
the network interface is further configured to obtain a saving request message comprising application and data that need to be saved;
the server further comprises a memory, wherein the memory, the network interface, and the processor are interconnected by using the bus; and
the memory is configured to save, according to the saving request message obtained by the network interface, the application and the data that need to be saved.

12. The server according to claim 10, wherein:
the network interface is further configured to obtain a deletion response message comprising security subdomain deletion success state information and the identifier of the deleted security subdomain; and
the processor is further configured to delete an identifier of a security subdomain in the mobile network operator profile according to the security subdomain deletion success state information and the identifier of the deleted security subdomain that are obtained by the network interface.

13. The server according to claim 12, wherein the network interface is further configured to send a second update request message to the subscription manager secure routing after the processor deletes the identifier of the security subdomain in the mobile network operator profile, wherein the second update request message comprises configuration information of the mobile network operator profile in which the identifier of the security subdomain is deleted by the processor, to enable the subscription manager secure routing to update the configuration information of the mobile network operator profile according to the second update request message.

14. The server according to claim 7, wherein:
the network interface is further configured to:
  send an activation request message when the status of the mobile network operator profile is an inactive state, and
  obtain an activation response message, wherein the activation response message comprises a status of the mobile network operator profile;
the processor is further configured to check the status of the mobile network operator profile; and
the network interface is further configured to send the management request message when the status of the mobile network operator profile is an active state.

15. A security domain management method, comprising:
obtaining a management request message comprising an issuer security domain profile identifier and a configuration request message;
managing a security subdomain in a mobile network operator profile corresponding to the issuer security domain profile identifier, wherein the security subdomain is configured to store configuration information of a first service;
wherein obtaining the management request message comprises:
  obtaining the configuration request message when the first service is being newly subscribed to, wherein the configuration request message comprises the issuer security domain profile identifier of the mobile network operator profile and the configuration information of the first service, and the configuration information of the first service comprises application and data that are of the first service;
wherein managing the security subdomain in the mobile network operator profile comprises:
  creating the security subdomain in the mobile network operator profile corresponding to the issuer security domain profile identifier, wherein the security subdomain is configured to store the configuration information of the first service;
allocating an identifier to the security subdomain; and
managing the security subdomain according to the identifier of the security subdomain.

16. The method according to claim 15, wherein after allocating an identifier to the security subdomain, the security domain management method further comprises:
sending a configuration response message, wherein the configuration response message comprises the identifier of the security subdomain, to enable a server to manage the security subdomain according to the configuration response message.

17. The method according to claim 15, wherein:
the management request message comprises a deletion request message;
obtaining a management request message comprising an issuer security domain profile identifier comprises:
  obtaining the deletion request message when the first service ends, wherein the deletion request message comprises the issuer security domain profile identifier and an identifier of the security subdomain; and
managing a security subdomain in a mobile network operator profile corresponding to the issuer security domain profile identifier, wherein the security subdomain is configured to store configuration information of the first service comprises:
  deleting, according to the issuer security domain profile identifier and the identifier of the security subdomain that are comprised in the deletion request message, the security subdomain in the mobile network operator profile corresponding to the issuer security domain profile identifier.

* * * * *